United States Patent
Hayashi

(10) Patent No.: US 11,225,176 B2
(45) Date of Patent: Jan. 18, 2022

(54) CONVEYANCE SEAT

(71) Applicant: TS TECH CO., LTD., Saitama (JP)

(72) Inventor: Masao Hayashi, Tochigi (JP)

(73) Assignee: TS TECH CO., LTD., Saitama (JP)

(*) Notice: Subject to any disclaimer, the term of this patent is extended or adjusted under 35 U.S.C. 154(b) by 0 days.

(21) Appl. No.: 16/648,795

(22) PCT Filed: Sep. 26, 2018

(86) PCT No.: PCT/JP2018/035782
§ 371 (c)(1),
(2) Date: Mar. 19, 2020

(87) PCT Pub. No.: WO2019/065773
PCT Pub. Date: Apr. 4, 2019

(65) Prior Publication Data
US 2020/0215943 A1 Jul. 9, 2020

(30) Foreign Application Priority Data

Sep. 26, 2017 (JP) .............................. JP2017-185228

(51) Int. Cl.
*B60N 2/30* (2006.01)
*B60N 2/07* (2006.01)
*B60N 2/20* (2006.01)

(52) U.S. Cl.
CPC ......... *B60N 2/3013* (2013.01); *B60N 2/3047* (2013.01); *B60N 2/07* (2013.01);
(Continued)

(58) Field of Classification Search
CPC .. B60N 2/3013; B60N 2/3047; B60N 2/3065; B60N 2/3072; B60N 2/3075;
(Continued)

(56) References Cited

U.S. PATENT DOCUMENTS

| | | | | |
|---|---|---|---|---|
| 6,817,670 B2* | 11/2004 | Macey | ................. | B60N 2/3013 297/341 |
| 7,134,723 B2* | 11/2006 | Padberg | ............... | B60N 2/3013 297/341 |
| 7,648,202 B2* | 1/2010 | Bokelmann | .......... | B60N 2/1864 297/341 |

(Continued)

FOREIGN PATENT DOCUMENTS

| | | |
|---|---|---|
| JP | 2000-333762 A | 12/2000 |
| JP | 2008-030658 A | 2/2008 |

(Continued)

OTHER PUBLICATIONS

International Search Report dated Nov. 20, 2018 for the International Application No. PCT/JP2018/035782, with English translation.

*Primary Examiner* — Syed A Islam
(74) *Attorney, Agent, or Firm* — Michael Best & Friedrich LLP

(57) ABSTRACT

In a vehicle seat that can switch the state of a seat main body which includes a seat back and a seat cushion between a seatable state in which the seat back is erected to a car body floor to allow a seated occupant on the seat cushion and a storage state in which the seat back tilts down to the car body floor and the seat cushion is disposed between the seat back and the car body floor, the vehicle seat is provided with a guide part that contacts the lower portion of the seat cushion and supports the seat cushion when the seat state is in the seatable state, that slidably contacts a part of the seat main body in the transition of the state to the storage state, and that thus guides the movement of the seat back and the seat cushion.

13 Claims, 29 Drawing Sheets

(52) U.S. Cl.
CPC .............. *B60N 2/20* (2013.01); *B60N 2/30* (2013.01); *B60N 2/305* (2013.01); *B60N 2/3065* (2013.01); *B60N 2/3072* (2013.01); *B60N 2/3077* (2013.01); *B60N 2/3079* (2013.01)

(58) Field of Classification Search
CPC .... B60N 2/3077; B60N 2/3079; B60N 2/305; B60N 2/30
See application file for complete search history.

(56) References Cited

U.S. PATENT DOCUMENTS

| | | | |
|---|---|---|---|
| 8,424,969 B2 * | 4/2013 | Kammerer | ............ B60N 2/235 297/329 |
| 9,156,380 B2 * | 10/2015 | Shiotani | .................. B60N 2/36 |
| 2007/0216185 A1 | 9/2007 | McMillen | |
| 2008/0164740 A1 | 7/2008 | Harper et al. | |
| 2008/0203772 A1 | 8/2008 | Holdampf | |
| 2009/0256379 A1 | 10/2009 | Yamada et al. | |
| 2016/0137105 A1 | 5/2016 | Akutsu et al. | |
| 2017/0021746 A1 * | 1/2017 | Akutsu | ................ B60N 2/3031 |
| 2017/0313215 A1 | 11/2017 | Akutsu et al. | |
| 2018/0186252 A1 | 7/2018 | Akutsu et al. | |

FOREIGN PATENT DOCUMENTS

| | | | | |
|---|---|---|---|---|
| JP | 2011162059 A * | 8/2011 | ........... | B60N 2/3013 |
| JP | 2015-000624 A | 1/2015 | | |
| JP | 2016-107881 A | 6/2016 | | |
| WO | 2016/076318 A1 | 5/2016 | | |

\* cited by examiner

CONVEYANCE SEAT

CROSS-REFERENCE TO RELATED APPLICATIONS

This application is entering into the national phase of PCT Application No. PCT/JP2018/035782, filed on Sep. 26, 2018. Further, this application claims the benefit of priority from Japanese Application No. 2017-185228, filed on Sep. 26, 2017, the entire contents of which are incorporated herein by reference.

TECHNICAL FIELD

The present invention relates to a conveyance seat, and more specifically to a conveyance seat that can switch the state between a seatable state in which a seat back is erected to a car body floor to allow a seated occupant to be seated on a seat cushion and a storage state in which the seat back tilts down to the car body floor and the seat cushion is disposed between the seat back and the car body floor.

BACKGROUND ART

A conveyance seat that can switch the state between the seatable state and the storage state is already known. Among such conveyance seats, in the transition of the state to the storage state, there is a seat that is configured in which a seat back is tilted down to a car body floor and a seat cushion is disposed between the seat back and the car body floor. An example of the seat includes a conveyance seat described in Patent Literature 1.

The conveyance seat described in Patent Literature 1 is a so-called dive down type vehicle seat, having a support base that rotatably supports a seat back, a base cover that covers the support base, and a leg member that supports the seat cushion. In the conveyance seat described in Patent Literature 1, the seat cushion is coupled to the seat back in a rotatable state.

When the conveyance seat that is described in Patent Literature 1 and that is configured as described above is in a seatable state, the leg member is retained by a leg retaining member composed of a leaf spring in a nearly C-shape at the position below the seat cushion, and the seat cushion is supported by the leg member from below.

On the other hand, when the state of the conveyance seat described in Patent Literature 1 is transitioned from the seatable state to the storage state, the leg member is detached from the leg retaining member, and the seat cushion rotates in the orientation in which the seat cushion is brought close to the seat back. After that, as a result that the seat back tilts forward, a seat main body is stored in a storage space provided in front of the seat.

Note that when the seat main body moves toward the storage space, a predetermined part of the seat main body (specifically, a coupling member provided at the side end portion of the seat main body for coupling the seat cushion to the seat back) slidably contacts a guide part provided on the base cover. Thus, the seat main body is smoothly moved toward the storage space while being guided by the guide part.

CITATION LIST

Patent Literature

PATENT LITERATURE 1: JP 2015-000624

SUMMARY OF INVENTION

Technical Problem

The conveyance seat is desired to reduce the number of seat components. Therefore, it is desired to configure the conveyance seat that can switch the state between the seatable state and the storage state using a much smaller number of components (specifically, the number smaller than the number of the conventional components of the conveyance seat having a leg member).

It is preferable to reserve a space, in which a bag is placed, at the position below the seat main body (more specifically, at the position below the seat cushion). To this end, a conveyance seat is desired, which can reserve a bag accommodation space at the position below the seat main body when the conveyance seat is in the seatable state.

Therefore, the present invention has been made in view of the above problems, and an object of the present invention is to provide a conveyance seat that switches the state between a seatable state and a storage state and is composed of a much smaller number of components.

Another object of the present invention is to provide a conveyance seat that can reserve a bag accommodation space at the position below a seat main body.

Solution to Problem

The problems are solved by a conveyance seat of the present invention, the conveyance seat having a seat main body that includes a seat back and a seat cushion, the seat main body being operable to switch a state between a seatable state in which the seat back is erected to a car body floor to allow seated occupant to be seated on the seat cushion and a storage state in which the seat back tilts down to the car body floor and the seat cushion is disposed between the seat back and the car body floor; and a guide part that guides movement of the seat back and the seat cushion in which when the state is in the seatable state, the guide part contacts a lower portion of the seat cushion to support the seat cushion, and in transition of the state to the storage state, the guide part slidably contacts a part of the seat main body.

In the conveyance seat of the present invention configured as described above, in the transition of the seat state to the storage state, the guide part slidably contacts a part of the seat main body, and thus guides the movement of the seat main body. When the seat state is in the seatable state, the guide part contacts the lower portion of the seat cushion and supports the seat cushion. That is, according to the conveyance seat of the present invention, the guide part includes a function that supports the seat cushion in the seatable state. Thus, it is unnecessary to provide another member that supports the seat cushion (e.g. the leg member included in the vehicle seat described in Patent Literature 1), and the number of seat components is reduced by that member.

In the conveyance seat, when the state is in the seatable state, the guide part may support the seat cushion at a position on a rear side from a center of the seat cushion in a front to back direction of the seat main body.

In the configuration, the rear side portion of the seat cushion on which the thighs of the seated occupant are placed is supported by the guide part when the occupant is seated on the seat. Thus, the seat cushion can be more stably supported when the occupant is seated on the seat.

In the conveyance seat, the guide part may have a first guide part and a second guide part that are disposed at positions separated from each other in a width direction of the seat main body. The first guide part and the second guide part may be integrated as one component. A component that forms the first guide part and the second guide part may be provided with a bag storage part that is formed between the first guide part and the second guide part in the width direction.

In the configuration, when the seat state is in the seatable state, the seat cushion is supported by the first guide part and the second guide part. Thus, the support state of the seat cushion can be more stabilized. On the part located between the guide parts in the component that forms the first guide part and the second guide part, the bag storage part is provided. Thus, a bag accommodation space can be reserved at the position below the seat main body.

In the conveyance seat, the conveyance seat may include a slide rail mechanism that slidably moves the seat main body along a front to back direction of the seat main body and an operation member that is operated when the seat main body is slidably moved by the slide rail mechanism. When the state is in the seatable state, the operation member may be at a position below the seat cushion, the guide part may be provided at an end portion on a side much closer to an outer side of a car body in both end portions of the conveyance seat in a width direction of the seat main body, and the operation member may be disposed so as to cross a range in which the guide part is provided in the width direction.

In the configuration, the operation member is disposed so as to cross the range in which the guide part is provided in the seat width direction. As described above, the disposition position of the operation member is set in consideration of the disposition position of the guide part, and thus the size of the conveyance seat including the operation member can be made more compact. The operation member is mounted at the end portion much closer to the outer side of the car body in the seat width direction. Thus, the operation member can be operated from the outer side of the car body.

In the conveyance seat, the conveyance seat further includes a seat belt wearing buckle that is disposed at a side position of the seat main body in a width direction of the seat main body. The guide part may be disposed at a position out of a range in which the buckle is provided in the width direction.

In the configuration, the guide part is disposed at a position separated from the seat belt wearing buckle in the seat width direction. Thus, the guide part can be disposed while the interference with the buckle is suppressed.

In the conveyance seat, the conveyance seat further includes an armrest that is mounted at an end portion of the seat back in a width direction of the seat main body. The guide part may be disposed so as to cross a range in which the armrest is provided in the width direction.

In the configuration, the guide part is disposed so as to cross the range in which the armrest is provided in the seat width direction. In other words, at least a part of the armrest is located on the inner side from the outer end of the guide part in the seat width direction. As a result, the degree of projection of the armrest to the outer side in the seat width direction can be suppressed.

In the conveyance seat, the guide part may be formed in which a part of a resin molded component protrudes upward, and a protruding part that constitutes the guide part in the resin molded component may include a rib that extends from a part located at a top end to downward in an inner wall surface that surrounds a cavity which is formed on an inner side of the protruding part.

In the configuration, on the inner side of the protruding part that constitutes the guide part in the resin molded component, the rib is included from the upper end portion of the protruding part to downward. Thus, the stiffness of the guide part can be improved, and when the state of the seat is in the seatable state, the seat cushion can be more appropriately supported by the guide part.

Alternatively, in the conveyance seat, the guide part may be formed in which a part of a resin molded component protrudes upward, a cavity may be provided on an inner side of a protruding part that constitutes the guide part in the resin molded component, and in the cavity, a reinforcement member that reinforces an upper end portion of the protruding part may be accommodated.

In the configuration, on the inner side of the protruding part that constitutes the guide part in the resin molded component, the reinforcement member that reinforces the upper end portion of the protruding part is accommodated. Thus, the stiffness of the guide part can be improved, and when the state of the seat is in the seatable state, the seat cushion can be more appropriately supported by the guide part.

In the conveyance seat, the seat main body may be operable to switch the state to a tilt-up state in which the seat back is erected to the car body floor and the seat cushion tilts up toward the seat back. On a back surface of the seat cushion, a convex projection that contacts the car body floor when the state is in the storage state may be provided. A convex projection may be slidably movable on the back surface along a width direction of the seat main body. When the state is in the tilt-up state, after the convex projection reaches one end position of a slide movement range of the convex projection, the state may be locked in the tilt-up state, and after the convex projection moves toward another end position in the slide movement range, the state may be unlocked.

In the configuration, the convex projection provided on the seat cushion is slidably moved, and thus the state of the seat main body can be locked in the tilt-up state, and the locking can be unlocked. As described above, the locking and unlocking of the seat state can be switched using the convex projection, and thus it is unnecessary to further provide a member that switches the state. That is, according to the configuration, the conveyance seat in the configuration in which the seat state is locked in the tilt-up state or locking is unlocked can be configured using a much smaller number of components.

Advantageous Effects of Invention

According to the conveyance seat of the present invention, the number of seat components is more reduced, because it is unnecessary to provide another member that supports the seat cushion.

According to the conveyance seat of the present invention, the rear side portion of the seat cushion on which the thighs of the seated occupant are placed when the occupant is seated on the seat is supported by the guide part, the seat cushion is more stably supported when the occupant is seated on the seat.

According to the conveyance seat of the present invention, the support state of the seat cushion can be more stabilized. A bag accommodation space can be reserved at the position below the seat main body.

According to the conveyance seat of the present invention, the size of the conveyance seat including the operation member can be made more compact. The operation member can be operated from the outer side of the car body.

According to the conveyance seat of the present invention, the guide part can be disposed while the interference with the seat belt wearing buckle is suppressed.

According to the conveyance seat of the present invention, as a result that at least a part of the armrest is located on the inner side from the outer end of the guide part in the seat width direction, the degree of projection of the armrest to the outer side in the seat width direction can be suppressed.

According to the conveyance seat of the present invention, on the inner side of the protruding part that constitutes the guide part in the resin molded component, the rib is included from the upper end portion of the protruding part to downward. Thus, the stiffness of the guide part is improved, and the guide part more appropriately supports the seat cushion.

According to the conveyance seat of the present invention, on the inner side of the protruding part that constitutes the guide part in the resin molded component, the reinforcement member is accommodated. Thus, the stiffness of the guide part is improved, and the guide part more appropriately supports the seat cushion.

According to the conveyance seat of the present invention, the conveyance seat in the configuration in which the seat state is locked in the tilt-up state or locking is unlocked can be configured using a much smaller number of components.

DESCRIPTION OF EMBODIMENTS

In the following, the configuration of a conveyance seat according to a first embodiment of the present invention will be described with reference to the drawings. However, embodiments described below will be described for easy understanding of the present invention, and do not limit the present invention. That is, the present invention can be modified and improved without deviating from the gist, and the present invention of course includes its equivalents.

In the following description, the content of the materials, shapes, and sizes of seat components is merely one of specific examples, and does not limit the present invention.

Note that in the following, a vehicle seat is taken as an example of the conveyance seat, and an example configuration of the vehicle seat will be described. However, the present invention is also applicable to seats installed on ships and aircrafts, for example, other than the conveyance seat for the vehicle seat.

In the following description, the term "front to back direction" means the front to back direction of the vehicle seat (in other words, the front to back direction of a seat main body), and means a direction matched with the traveling direction of a vehicle in driving. The term "seat width direction" means the breadth direction of the vehicle seat (in other words, the width direction of the seat main body), and means a direction matched with a right to left direction when viewed from an occupant seated on the vehicle seat. The term "up to down direction" means the up to down direction of the vehicle seat, and means a direction matched with the vertical direction when the vehicle drives on a horizontal plane.

The term "vehicle outer side" in the seat width direction means the side much closer to the outer side of a car body (for easy under standing, the side closer to the nearest door), and the term "vehicle inner side" means the side much closer to the inner side of the car body (for easy under standing, the side separated from the nearest door).

In the following description, the term "rotate" means rotating operation about the axis along the seat width direction unless otherwise specified.

Note that in the following, the shapes, positions, and attitudes, for example, of seat components will be described in the assumption of the case in which the vehicle seat is in a seatable state, described later, unless otherwise specified.

Basic Configuration of a Vehicle Seat according to a First Embodiment

Figure 1:
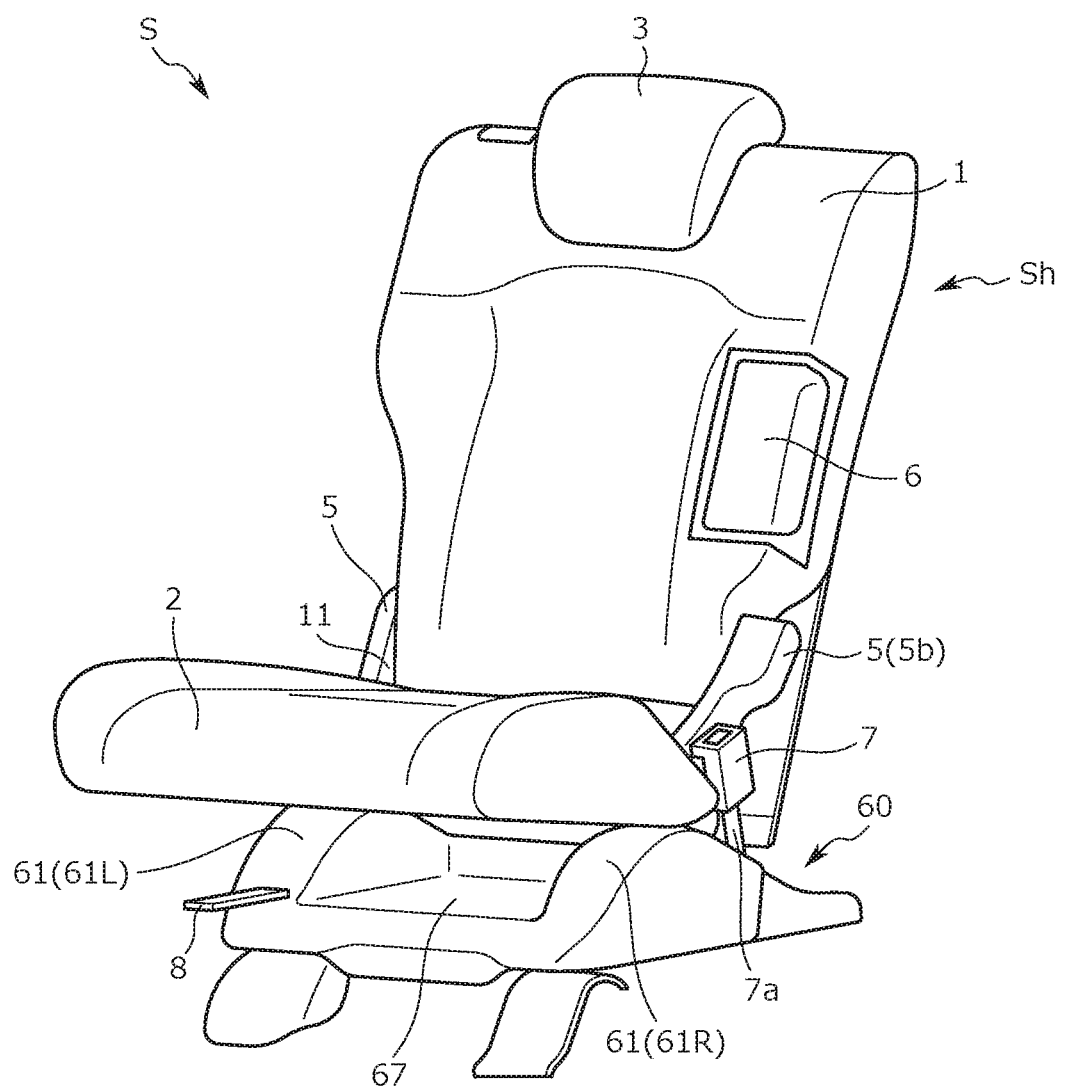
FIG. 1 is a perspective view of a conveyance seat according to a first embodiment of the present invention.
Figure 1:
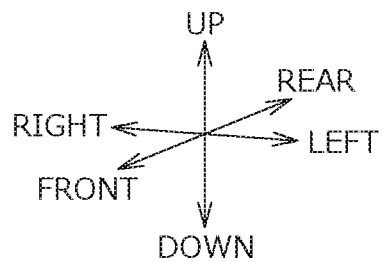

The basic configuration of a vehicle seat according to a first embodiment (in the following, a vehicle seat S) will be described with reference to FIG. 1. FIG. 1 is a perspective view of the vehicle seat S.

The vehicle seat S is a seat that is placed on a car body floor, and is a seat on which the occupant of vehicle is seated. In the present embodiment, the vehicle seat S is used as a rear seat corresponding to the back seat of a vehicle. However, the vehicle seat S is not limited to this. The vehicle seat S may be used as a middle seat in the second row or a rear seat in the third row in a vehicle having seats in three rows in the front to back direction.

As shown in FIG. 1, the vehicle seat S has a seat main body Sh that forms its main body part. As shown in FIG. 1, the seat main body Sh includes a seat back 1, a seat cushion 2, and a headrest 3. The seat back 1 is mounted on the car body floor in a rotatable state through a support base 40, described later.

The rear end portion of the seat cushion 2 is coupled to the lower end portion of the seat back 1. Note that as shown in FIG. 1, a coupling member 5 is present between the rear end portion of the seat cushion 2 and the lower end portion of the seat back 1. This coupling member 5 is mounted on the seat back 1 in a rotatable state. Thus, the seat cushion 2 can rotate to the seat back 1 together with the coupling member 5.

Below the seat main body Sh, a slide rail mechanism 4, described later, is installed. With the slide rail mechanism 4, the seat main body Sh is mounted on the car body floor in a slidably movable state in the front to back direction.

The seat main body Sh can be stored in a storage floor F formed in front of the seat main body Sh in the state in which the seat main body Sh is folded. The storage floor F is a recessed space that is formed by recessing a part of the car body floor downward (specifically, in the car body floor, apart located in front of the seat main body Sh when the seat main body Sh is in a seatable state).

<<Change in the State of the Seat Main Body>>

Figure 2:
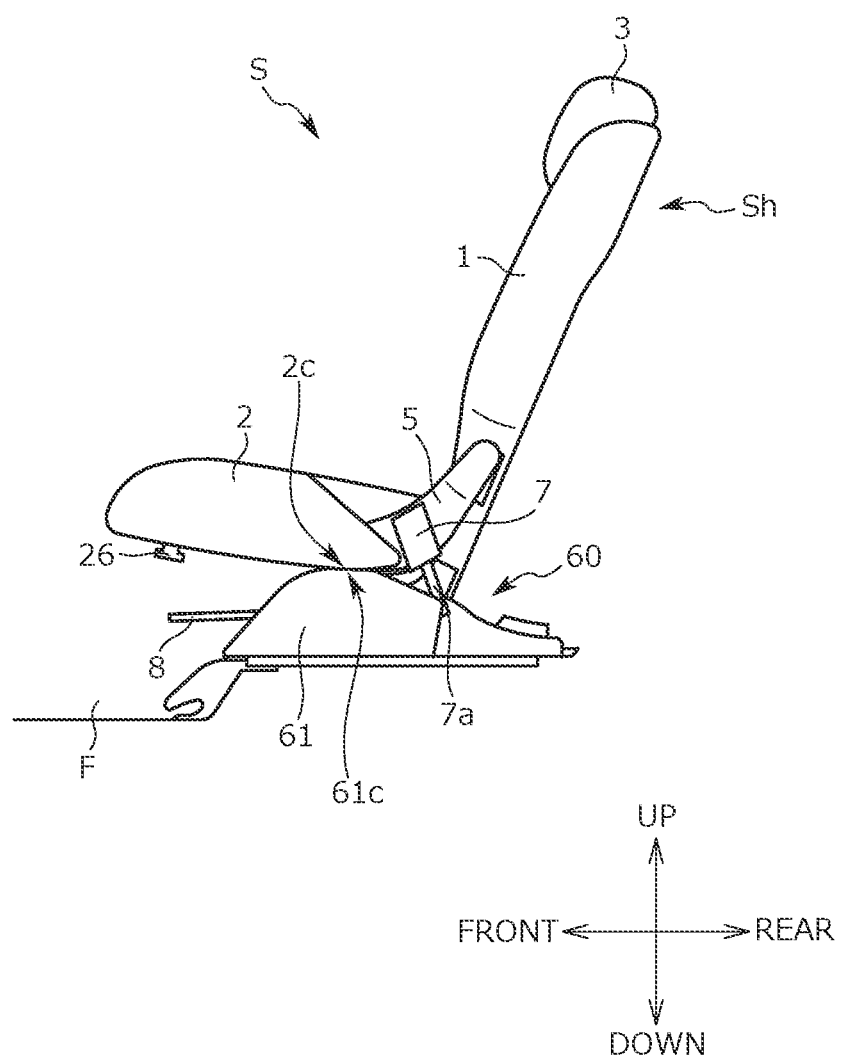
FIG. 2 is a side view of the conveyance seat when a seat state is in a seatable state.
Figure 3:
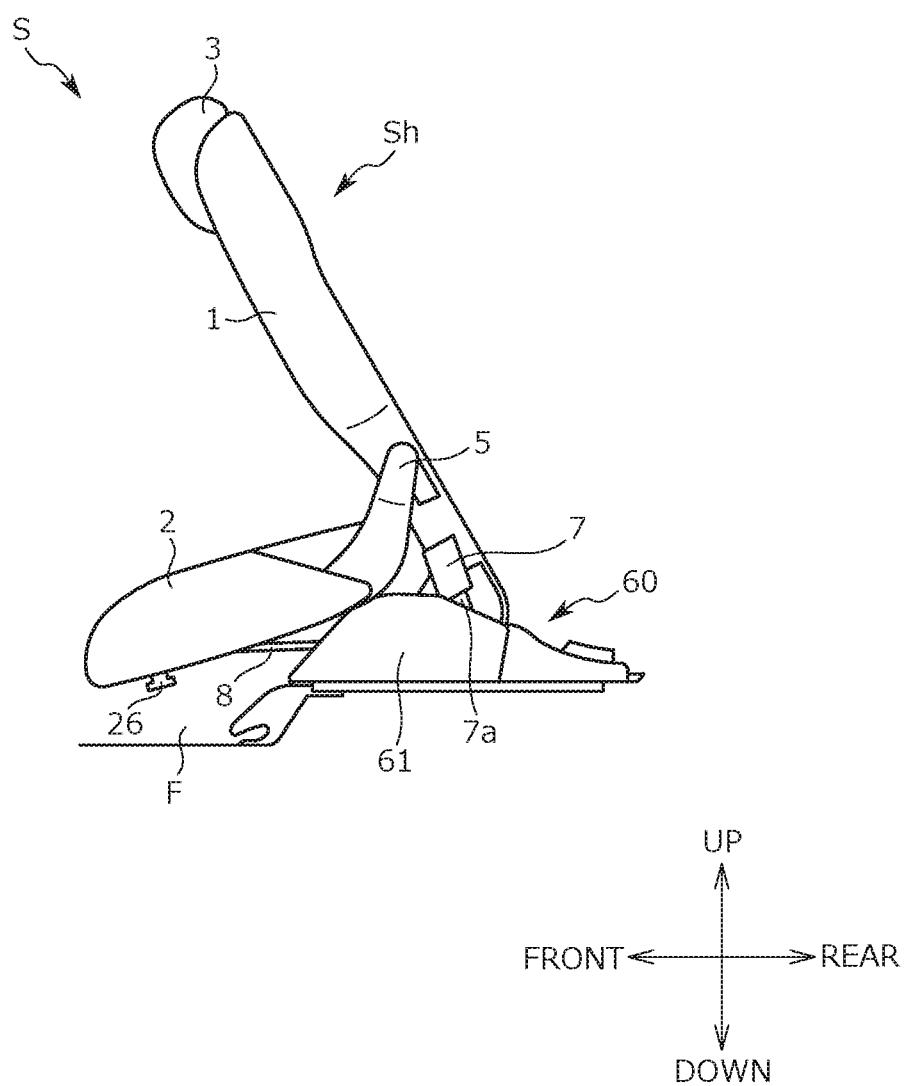
FIG. 3 is a side view of the conveyance seat in a midway stage in which the seat state is transitioned from a seatable state to a storage state.
Figure 4:
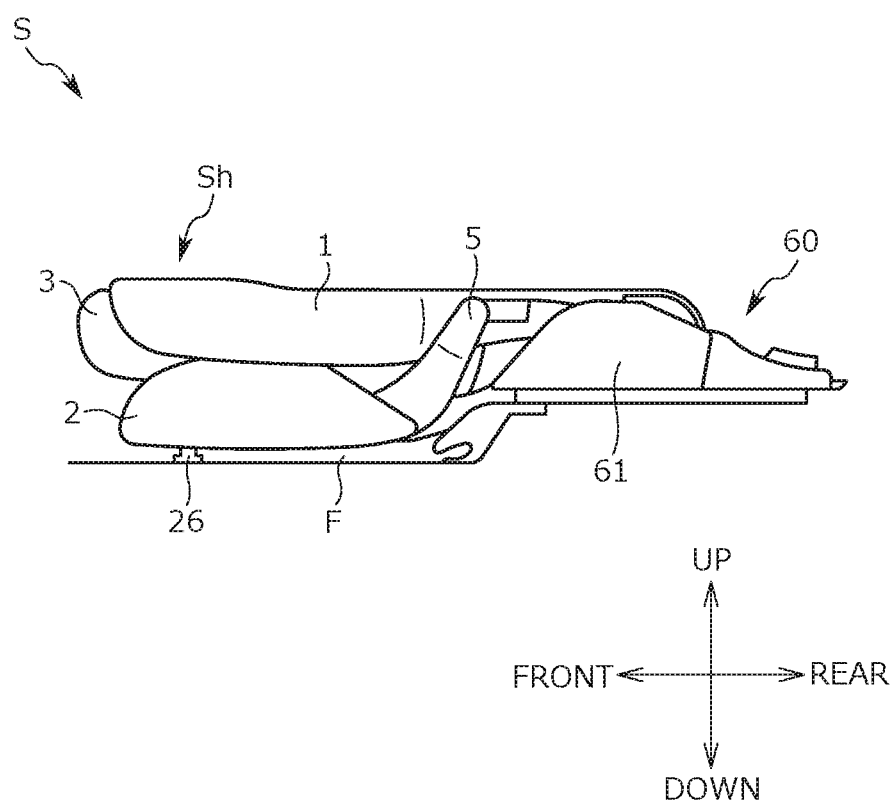
FIG. 4 is a side view of the conveyance seat when the seat state is in the storage state.

In the present embodiment, the state of the seat main body Sh (in the following, the seat state) can be changed. In the following, a change in the seat state will be described with reference to FIGS. 2 to 5. FIGS. 2 to 4 are side views of the vehicle seat S, FIG. 2 is a view when the seat state is in the seatable state, FIG. 3 is a view in a midway stage in which the seat state is transitioned from a seatable state to a storage state, FIG. 4 is a view when the seat state is in a storage state, and FIG. 5 is a perspective view of the vehicle seat S when the seat state is in a tilt-up state.

Figure 5:
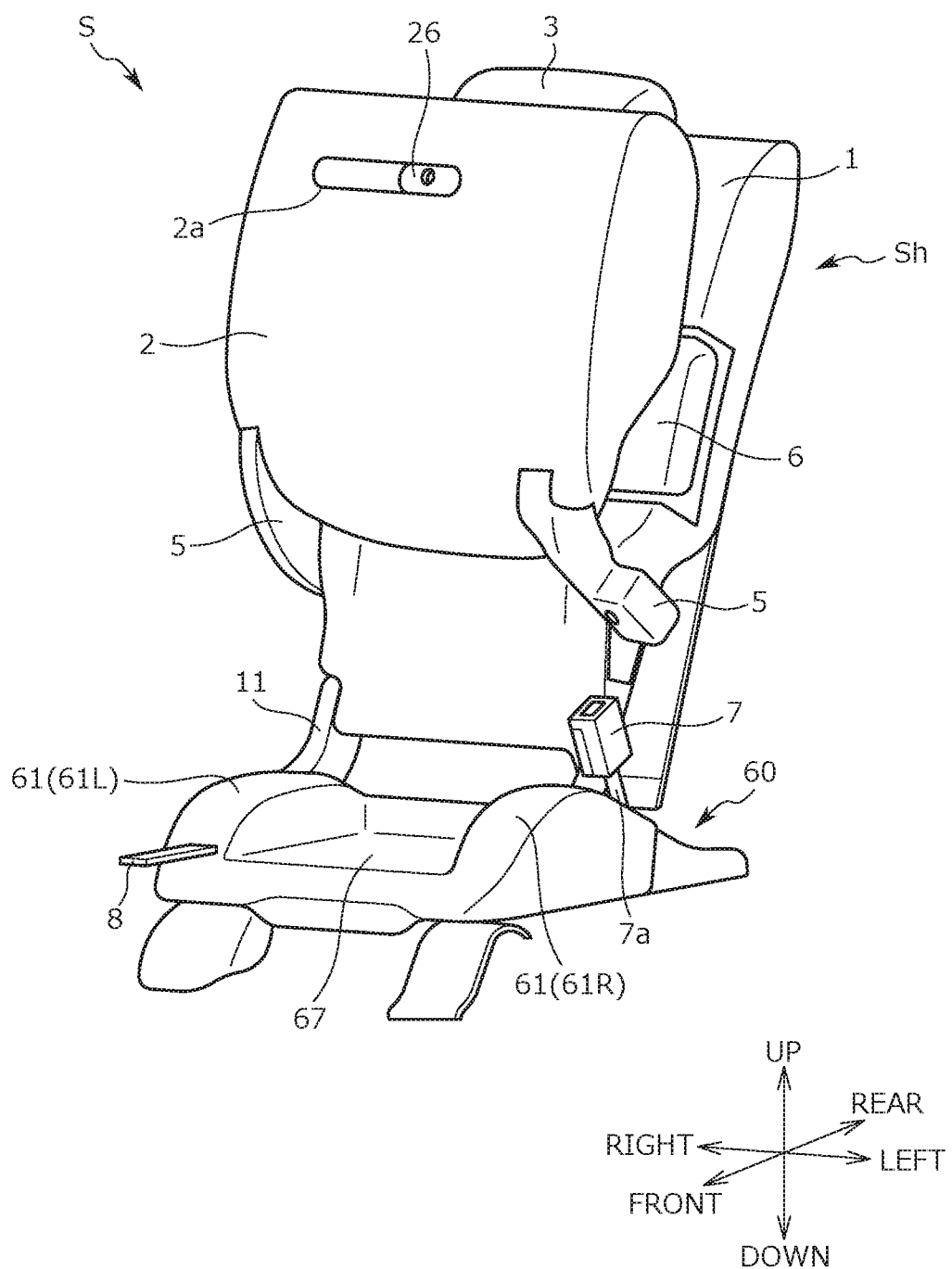
FIG. 5 is a perspective view of the conveyance seat when the seat state is in a tilt-up state.

In the present embodiment, the seat state is switchable between the seatable state shown in FIG. 2, the storage state shown in FIG. 4, and the tilt-up state shown in FIG. 5. The seatable state is a state in which the seat back 1 is erected to the car body floor and an occupant who is a seated occupant is allowed to be seated on the seat cushion 2. As shown in FIG. 1, when the seat state is in the seatable state, the seat back 1 is slightly inclined to backward, and the seat cushion 2 is in the attitude in which the seating surface of the seat cushion 2 is directed upward (on the surface on which the buttocks and thighs of the occupant are placed).

The storage state is a state in which the seat main body Sh is stored in the storage floor F in the state in which the seat main body Sh is folded. As shown in FIG. 3, in the transition of the state of the seat main body Sh to the storage state, the seat back 1 tilts down forward to the car body floor, the seat cushion 2 rotates in the orientation in which the seat cushion 2 comes close to the seat back 1. As shown in FIG. 4, when the seat state becomes the storage state, the height of the rear surface (the back surface) of the seat back 1 is the same height (the level) as the height of the area around the storage floor F in the car body floor, and the seat cushion 2 is disposed between the seat back 1 and the car body floor.

As shown in FIG. 5, a tip-up state is a state in which the seat back 1 is erected to the car body floor on one hand while the seat cushion 2 tilts up toward the seat back 1. Note that in the following, the tilt-up state is referred to as the "tip-up state".

The vehicle seat S according to the present embodiment is provided with a locking device that locks the seat state in the tip-up state. Note that when the vehicle seat S is in the seatable state, the vehicle seat S according to the present embodiment is not locked, and is movable.

Next, the outline of the motion of the components of the seat main body Sh when the seat state is switched will be descried. When the seat state is in the seatable state, the seat back 1 is in the attitude in which the seat back 1 is erected to the car body floor, and the seat cushion 2 is in the attitude in which the seat cushion 2 is almost horizontal to the car body floor.

In the case in which the seat state is switched from the seatable state to the storable state, the seat back 1 rotates to the car body floor such that the seat back 1 tilts down forward by biasing force from a biasing member, not shown. The seat cushion 2 rotates together with the coupling member 5 in the orientation in which the seat cushion 2 comes close to the seat back 1, while moving forward in association with the motion of the seat back 1 that tilts forward. At this time, as shown in FIG. 3, the under surface of the coupling member 5 of the seat main body Sh slidably contacts a predetermined part of a base cover 60 disposed at the position below the seat main body Sh. Thus, the seat cushion 2 smoothly moves forward, and then enters the inside of the storage floor F.

After that, the seat back 1 enters the inside of the storage floor F due to the motion of the seat back 1 that further tilts forward, and the seat cushion 2 moves forward along the bottom surface of the storage floor F. Finally, at the point in time at which the seat back 1 is folded over the seat cushion 2 in the storage floor F, the seat state reaches the storage state.

In the case in which the seat state is switched from the storage state to the tip-up state, the occupant manually raises the seat main body Sh that is stored in the storage floor F upward. At this time, the seat cushion 2 is in the attitude in which the seat cushion 2 is folded to the seat back 1 (i.e., the attitude in which the seat cushion 2 tilts up to the seat back 1). Therefore, the seat main body Sh is raised until the seat back 1 reaches the erected position (in other words, the position of the seat back 1 when the seat state is in the seatable state), and thus the seat state is switched to the tip-up state. Note that after the seat state is switched to the tip-up state, the seat back 1 is locked in the attitude in which the seat back 1 is erected to the car body floor.

In the case in which the seat state is switched from the tip-up state to the seatable state, the occupant performs the operation that unlocks the locking of the seat cushion 2. In the present embodiment, a damper 26 shown in FIG. 5 that is provided on the back surface of the seat cushion 2 is operated, and thus the locking of the seat cushion 2 is unlocked. After unlocked, the seat cushion 2 rotates together with the coupling member 5 in the orientation in which the seat cushion 2 is separated from the seat back 1 due to biasing force from the biasing member, not shown. At the point in time at which the seat cushion 2 reaches the seatable position (in other words, the position of the seat cushion 2 when the seat state is in the seatable state), the seat state is switched to the seatable position.

<<Configuration of the Seat Components>>

Figure 6:
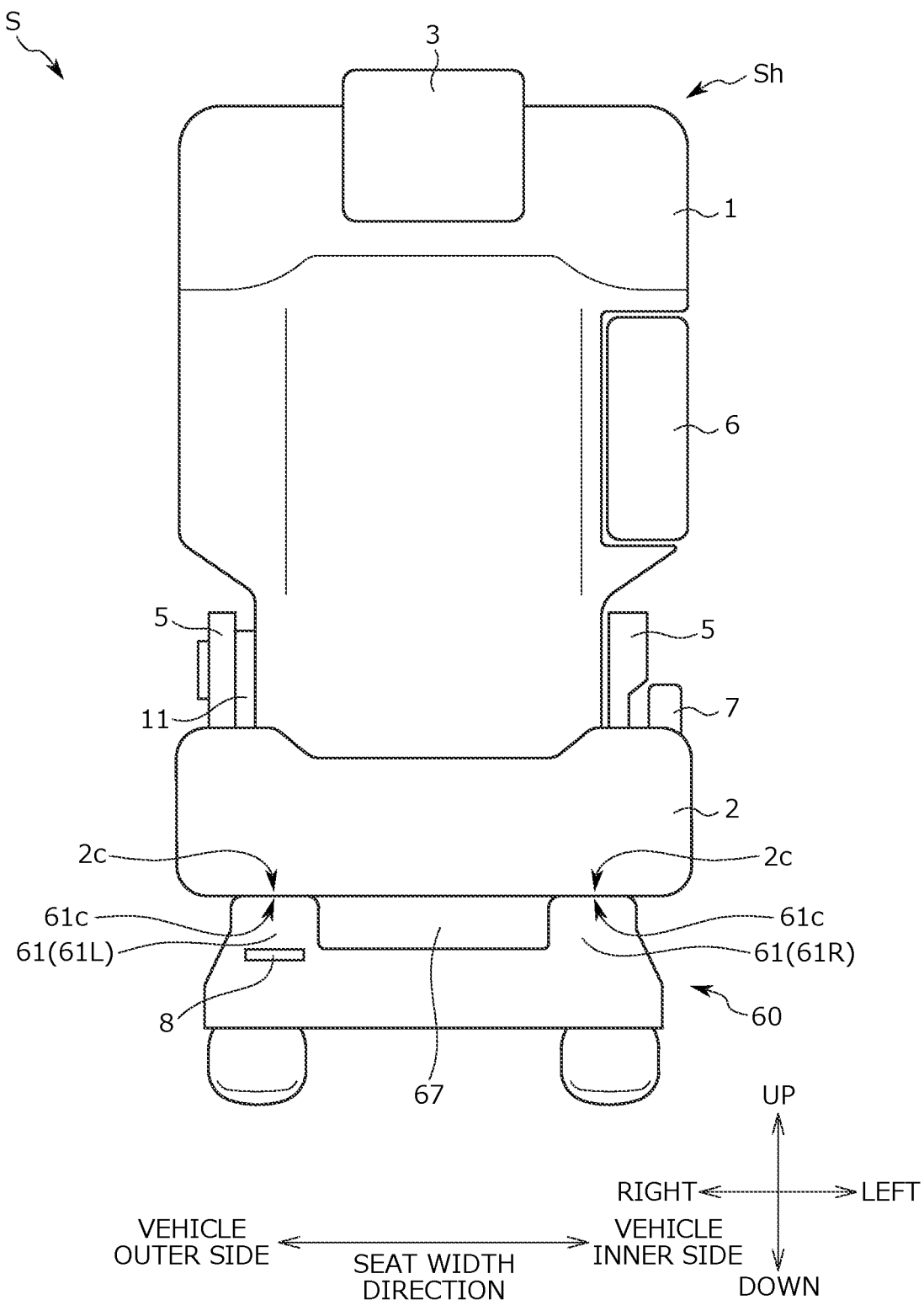
FIG. 6 is a front view of the conveyance seat according to the first embodiment of the present invention.
Figure 7:
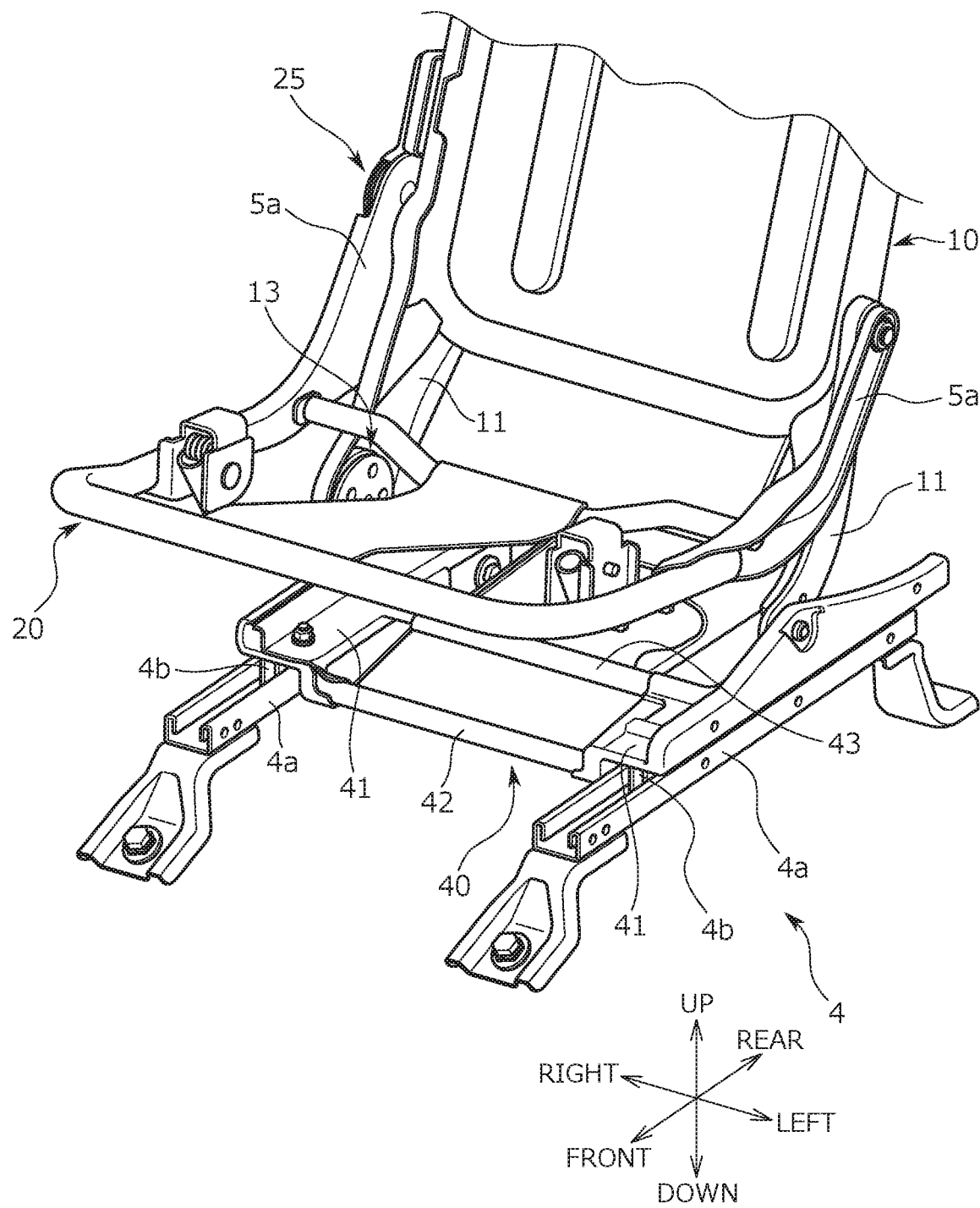
FIG. 7 is a view showing the lower side portion and peripheral devices of a seat frame of the conveyance seat.

In the following, the configuration of the components of the vehicle seat S will be described with reference to FIGS. 6 and 7 together with FIGS. 1 to 5 that are already described. FIG. 6 is a front view of the vehicle seat S. FIG. 7 is a view showing the lower side portion and peripheral devices of a seat frame forming the framework of the vehicle seat S.

As shown in FIG. 1 or FIG. 6 and any other drawings, the vehicle seat S includes the seat main body Sh. The seat main body Sh includes the seat back 1 and the seat cushion 2. The seat back 1 and the seat cushion 2 include frames shown in FIG. 7 (specifically, a seat back frame 10 and a seat cushion frame 20 respectively included).

The seat back 1 is coupled to the seat cushion 2 by the coupling member 5. The coupling member 5 is a member in an almost L shape when viewed from the lateral side, and has a coupling member main body part 5*a* shown in FIG. 7 and a coupling member cover part 5*b* shown in FIG. 1. The coupling member main body part 5*a* is formed by working a metal plate, and couples the seat back frame 10 to the seat cushion frame 20 at the end portion of the seat main body Sh in the seat width direction. The rear end portion of the coupling member main body part 5*a* is mounted on the seat back frame 10 in a rotatable state. In other words, the rear end of the coupling member main body part 5*a* rotates to the seat back frame 10, and thus the seat cushion 2 rotates together with the coupling member 5 to the seat back 1. The coupling member cover part 5*b* is a resin molded component, and covers the coupling member main body part 5*a* from the lateral side.

At the rear end portion of the coupling member main body part 5*a*, a cushion locking device 25 that is a locking device is mounted. The cushion locking device 25 is disposed at the position sandwiched between the coupling member main body part 5*a* and the lateral end of the seat back frame 10 in the seat width direction. The cushion locking device 25 is in a publicly known structure (the structure of a typical cushion locking device), and can switch its state between a locked state and an unlocked state. When the cushion locking device 25 in the locked state, the coupling member 5 is in a rotation disabled state. Thus, the seat cushion 2 is locked in the attitude at that point in time. On the other hand, when the state of the cushion locking device 25 is turned to the unlocked state, the coupling member 5 is turned to the rotatable state to the seat back frame 10. As a result, the seat cushion 2 can be freely rotated to the seat back 1.

More specifically of the configuration of the seat main body Sh, as shown in FIG. 5, on the back surface of the seat cushion 2 of the present embodiment (the under surface of the seat cushion 2 when the seat state is in the seatable state), the damper 26 is provided. The damper 26 is a convex projection that projects from the back surface of the seat cushion 2 downward (toward the opposite side of the side where the seating surface is located in the thickness direction of the seat cushion 2). The damper 26 is in an oblong shape when viewed from the front, and as shown in FIG. 5, in the back surface of the seat cushion 2, the damper 26 projects from the seat width center part in a front end region.

When the seat state is in the storage state, the damper 26 contacts the car body floor at its distal end (lower end). Thus, it can be suppressed that the back surface of the seat cushion 2 contacts the car body floor for soiling while the seat state is being in the storage state.

The damper 26 is operated when the seat state is switched from the tip-up state to the seatable state. Specifically, in the front end region of the back surface of the seat cushion 2, a slit 2*a* that extends from the center portion of the seat cushion 2 toward the vehicle outer side along the seat width direction is provided. In the present embodiment, the damper 26 can slidably move in the inside of the slit 2*a* along the seat width direction. The damper 26 is coupled to the cushion locking device 25 described above through a cable, not shown.

In the configuration, when the seat state is in the tip-up state, after the damper 26 reaches one end position in the slide movement range (specifically, the position that is corresponds to the center portion of the seat cushion 2 in the seat width direction in the range in which the slit 2*a* is formed), the seat cushion 2 is locked, and the seat state is locked in the tip-up state.

When the seat state is in the tip-up state, after the occupant slidably moves the damper 26 to the other end position in the slide range (specifically, the end position located on the vehicle outer side in the seat width direction in the range in which the slit 2*a* is formed), the cable connected to the damper 26 is pulled, and the cushion locking device 25 performs unlock operation. As a result, the locking of the seat state (strictly speaking, the locking of the seat cushion 2) is unlocked.

Note that the component that is operated to unlock the locking of the seat cushion 2 is not limited to the damper 26. However, the use of the damper 26 as a lock unlocking operation component enables configuring the vehicle seat S in the configuration in which the seat state is locked in the tip-up state or locking is unlocked using a much smaller number of components.

As shown in FIG. 1 or 6, the seat main body Sh includes an armrest 6. The armrest 6 is mounted at the end portion of the seat back 1 on the vehicle inner side in the seat width direction. More specifically, at the end portion of the seat back 1 on the vehicle inner side, a storage space is provided, which is formed by recessing the seat back 1 to the rear side. The armrest 6 is normally stored in the storage space that is formed in the seat back 1, and is taken out of the storage space when used. More specifically, the armrest 6 is mounted on the seat back 1 in a rotatable state, and normally erected in the storage space. When used, the armrest 6 rotates so as to tilt forward, and finally tilts down forward almost horizontally.

As the peripheral device of the seat main body Sh, the vehicle seat S has a seat belt wearing buckle 7. As shown in FIG. 1 or 6, the buckle 7 is disposed at the side position of the seat main body Sh. More specifically, in the seat width direction, the buckle 7 is disposed at the position adjacent to the seat main body Sh on the vehicle inner side. In the present embodiment, the buckle 7 has a support bracket 7*a* that supports its main body part (a part that is connected to the tongue of the seat belt), and the support bracket 7*a* is provided in a rotatable state to the car body floor. That is, the buckle 7 of the present embodiment is configured to be able to tilt forward to the car body floor by the rotation of the support bracket 7*a*. In the transition of the seat state to the storage state, the buckle 7 is pressed from the rear side by the side end portion of the seat back 1, and tilts forward together with the seat back 1.

As the peripheral device of the seat main body Sh, the vehicle seat S has the slide rail mechanism 4 shown in FIG. 7. The slide rail mechanism 4 is a device that slidably moves the seat main body Sh along the front to back direction, and is in a publicly known structure (the structure of a typical slide rail mechanism). That is, the slide rail mechanism 4 has a pair of lower rails 4*a* that are fixed on the car body floor and a pair of upper rails 4*b* that are slidably movable to the lower rails 4*a*. The seat main body Sh is mounted on the upper rails 4*b*, and moves front to back in association with the slidable motion of the upper rails 4*b*.

Note that the upper rail 4*b* is normally locked in the state in which the upper rail 4*b* is slidably unmovable. When the occupant performs a predetermined operation, the locking is unlocked, and the upper rail 4*b* is in the slidably movable state. More specifically, in the present embodiment, as an operation member that is operated to unlock the locking of the upper rail 4*b*, an operation strap 8 shown in FIG. 1 is provided. The operation strap 8 is a band-shaped member that is formed in an endless shape. As shown in FIG. 6, when the seat state is in the seatable state, the operation strap 8 is at a position below the seat cushion 2. In the present embodiment, in the both end portions of the vehicle seat S in the seat width direction, the operation strap 8 is provided at the end portion on the vehicle outer side. Thus, the operation strap 8 is operated from the vehicle outer side in the state in which the door is opened, and the locking of the upper rail 4*b* can be unlocked.

The operation strap 8 is connected to the slide locking mechanism through a cable, not shown. In regard to the slide locking mechanism, since a typical device that locks the upper rail 4*b* can be used, the description and drawings are omitted. When the operation strap 8 is pulled forward, the cable is pulled. As a result, the slide locking mechanism operates so as to unlock the locking of the upper rail 4*b*.

The vehicle seat S has the support base 40 shown in FIG. 7. The support base 40 is disposed at a position directly above the slide rail mechanism 4, and supports the seat back 1. The support base 40 has a pair of right and left base brackets 41 that are provided at positions separated from each other in the seat width direction, a front coupling part 42 that couples the front portions of the pair of right and left base brackets 41 to each other, and a center coupling part 43 that couples the front-to-back center portions of the pair of right and left base brackets 41 to each other.

The base bracket 41 is a metal plate member that extends long in the front to back direction, and is bolted to the top surface of the upper rail 4*b*. Therefore, when the upper rail 4*b* slidably moves, the support base 40 including the base bracket 41 moves front to back integrally with the upper rail 4*b*. In the pair of right and left base brackets 41, at the front-to-back center portion of one of the base brackets 41, the side wall of the base bracket 41 protrudes in a mountain shape, and at its peak portion, the lower end portion of a coupling link 11 is mounted in a rotatable state.

The coupling link 11 is a link member that is bent in a nearly bow shape, and is present between the lower end portion of the seat back frame 10 and the base bracket 41. In other words, the seat main body Sh (strictly speaking, the seat back 1) is fixed to the upper rail 4*b* of the slide rail mechanism 4 through the coupling link 11 and the support base 40.

The coupling link 11 is provided one each at the both seat width end portions of the seat main body Sh (two in total). The lower end portion of one of the coupling links 11 is supported on the peak portion of the front-to-back center portion of the base bracket 41 that is located on the same side where the coupling link 11 is located in the seat width direction in a rotatable state. Thus, the coupling link 11 rotates forward to the base bracket 41 of the support base 40, and the seat back 1 tilts forward in association with the rotation.

At the lower end portion of the other of the coupling links 11, a reclining device 13 is mounted. The reclining device 13 is disposed between the coupling link 11 and the base bracket 41 that is located on the same side where the coupling link 11 is located in the seat width direction. The reclining device 13 is in a publicly known structure (the structure of a typical reclining device), and can switch the state between the locked state and the unlocked state. When the reclining device 13 is in the locked state, the coupling link 11 is in the rotation disabled state, and thus the seat back 1 is locked in the attitude at that point in time. On the other hand, when the reclining device 13 is turned to the unlocked state, the coupling link 11 is in a rotatable state to the base bracket 41. As a result, the seat back 1 can be freely rotated.

As revealed from FIG. 1, the base cover 60 is a resin molded component that covers the support base 40 entirely and covers the slide rail mechanism 4 from above. In the present embodiment, the base cover 60 has the function that covers the support base 40 and the slide rail mechanism 4 as well as includes a function that guides the movement of the seat cushion 2 when the seat state is switched. The base cover 60 of the present embodiment includes a function that supports the seat cushion 2 from below when the seat state is in the seatable state. The configuration of the base cover 60 including these functions will be described in detail in the subsequent section.

<<Detailed Configuration of the Base Cover>>

Figure 8:
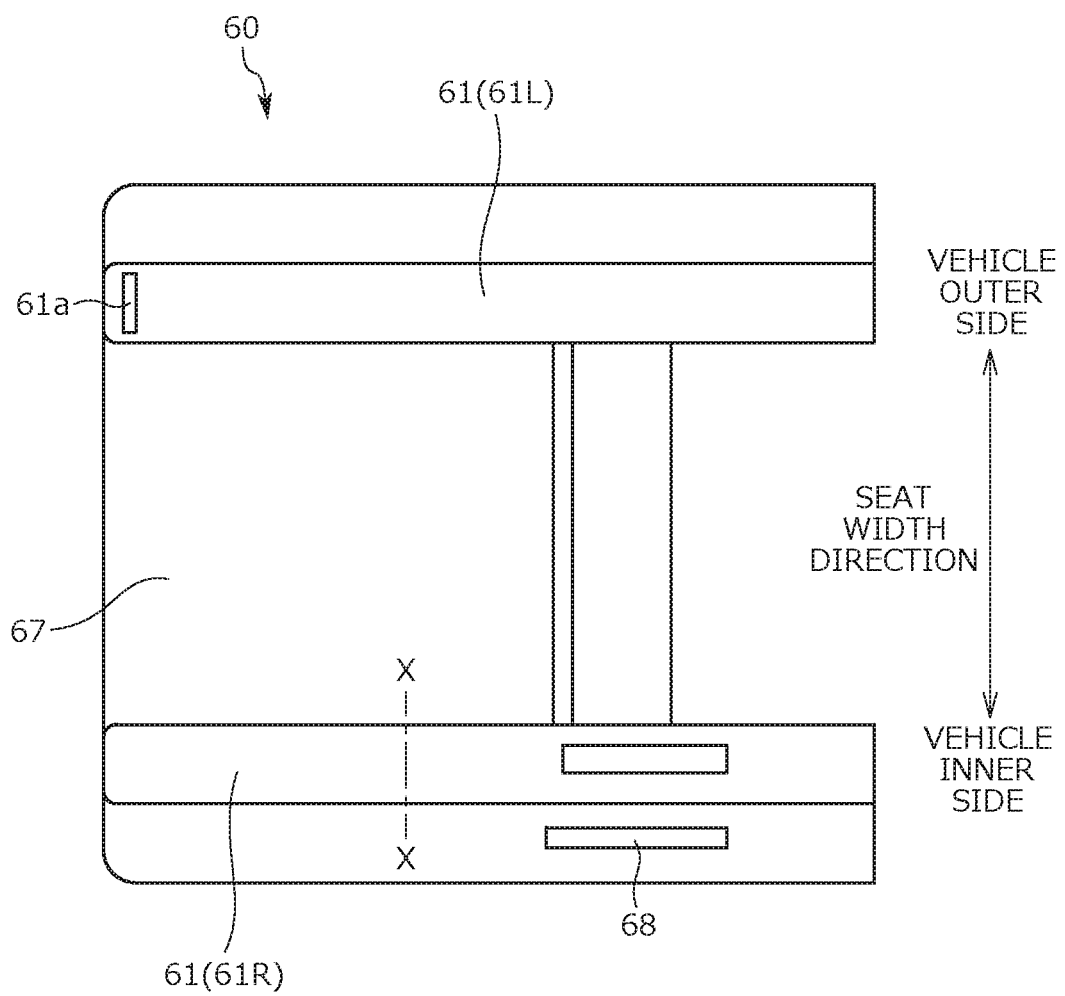
FIG. 8 is a view of a cover member when viewed from above.
Figure 8:
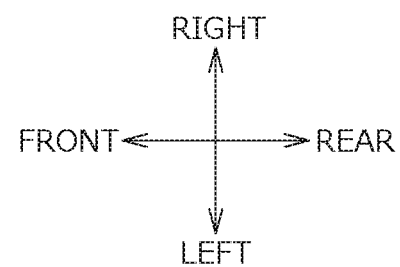
Figure 9:
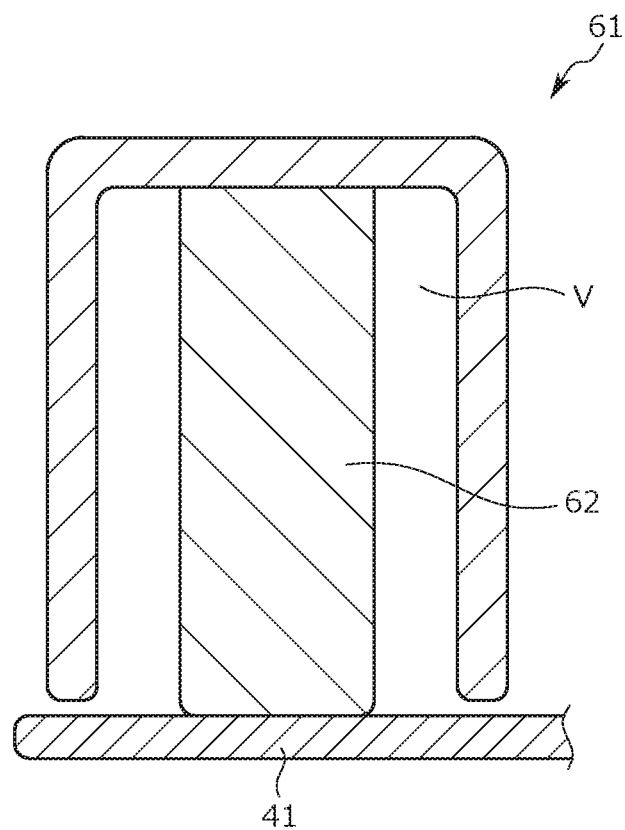
FIG. 9 is a cross sectional view showing the internal structure of a guide part.
Figure 9:
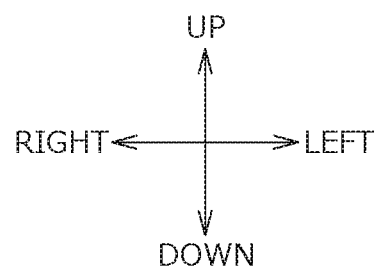
Figure 10:
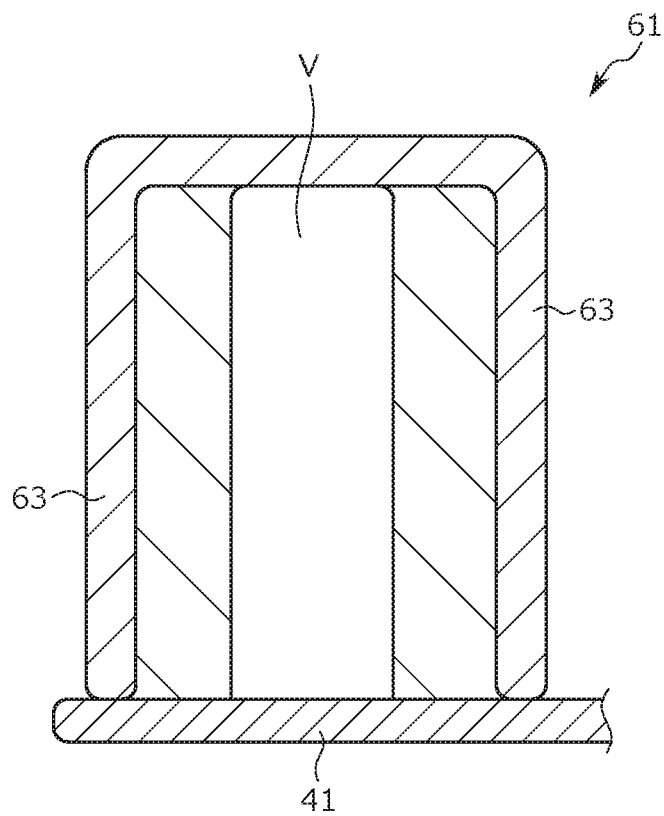
FIG. 10 is a view showing the internal structure of a guide part according to the first example modification.
Figure 10:
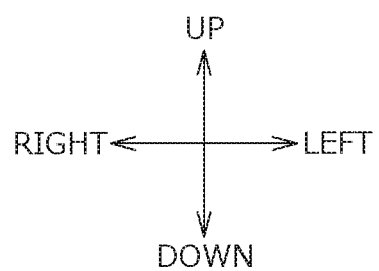
Figure 11:
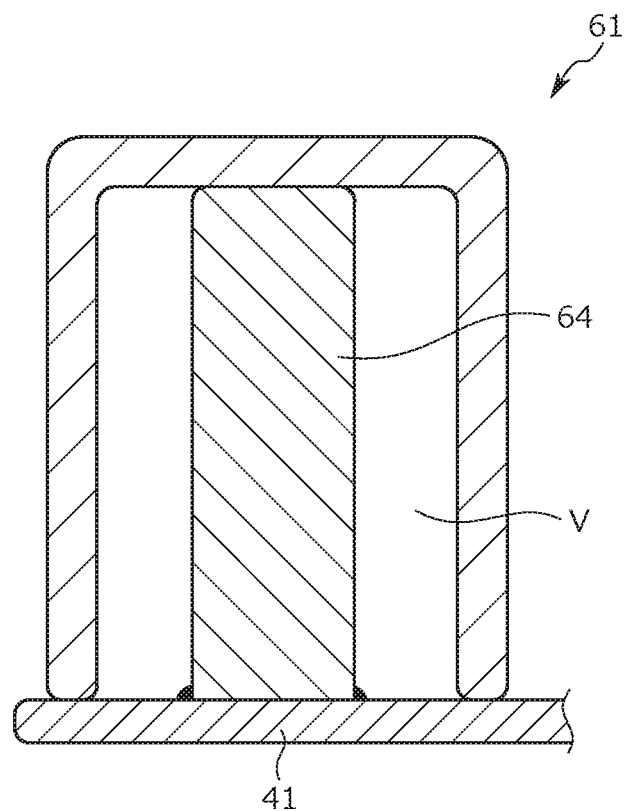
FIG. 11 is a view showing the internal structure of a guide part according to a second example modification.
Figure 11:
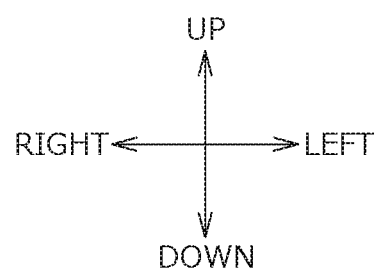
Figure 12:
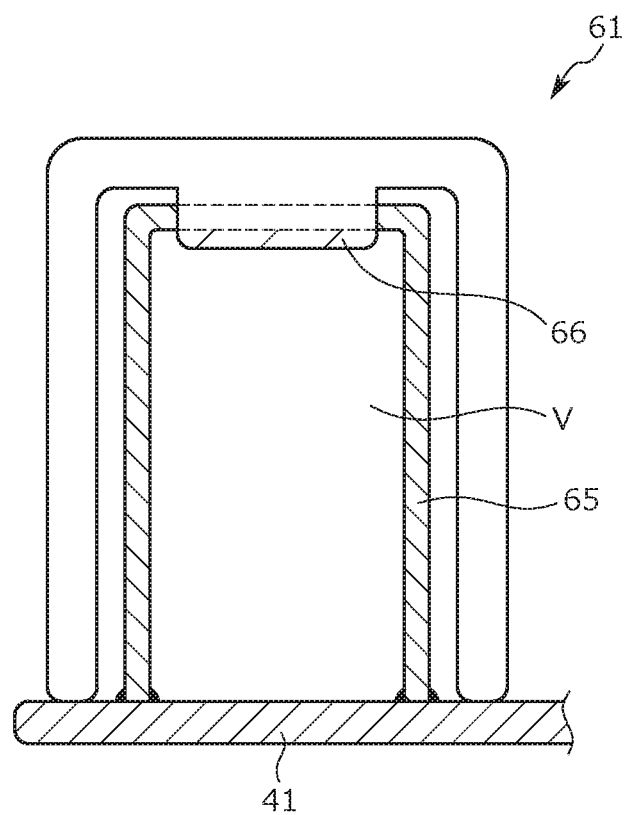
FIG. 12 is a view showing the internal structure of a guide part according to a third example modification.
Figure 12:
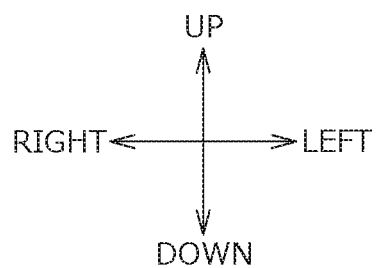

In the following, the detailed configuration of the base cover 60 will be described with reference to FIGS. 8 to 12 together with FIGS. 1 to 7 that are already described. FIG. 8 is a view of the base cover 60 when viewed from above. FIG. 9 is a cross sectional view showing the internal structure of the guide part 61 in the base cover 60, and is a view schematically showing an X-X cross section in FIG. 8. FIGS. 10 to 12 are cross sectional views showing the internal structure of the guide part 61 according to example modifications, and are views corresponding to FIG. 9.

The base cover 60 forms an outer shape shown in FIG. 8 in a top view, and is placed on the car body floor. The base cover 60 bulges above overall, and in its inner side, a space enough to accommodate the support base 40 and the base cover 60 is formed. The base cover 60 of the present embodiment is split into two pieces in front and back, and the base cover 60 is formed by the combination of two pieces (fragment-shaped pieces that constitute the base cover 60). However, the base cover 60 is not limited to this. The base cover 60 may be composed of one component (one piece) alone.

As shown in FIGS. 1 and 6, at the both seat width end portions of the base cover 60, a protruding part that protrudes upward from other parts is formed. This protruding part constitutes the guide part 61, and is provided so as to widen from the front end to the rear end of the base cover 60 along the front to back direction.

As shown in FIGS. 2 to 4, the guide part 61 is in a nearly mountain shape when viewed from the lateral side, and its upper end surface is a plane that projects upward and curves so as to form an arc. As shown in FIGS. 2 to 4, the front end surface of the guide part 61 is an inclined plane, and on its extension line, the storage floor F is disposed. The guide part 61 has a slight spread (breadth) in the seat width direction.

The guide part 61 that is configured as described above slidably contacts a part of the seat main body Sh in the transition of the seat state to the storage state, and thus guides the movement of the seat back 1 and the seat cushion 2. More specifically, in the transition of the seat state to the storage state, when the seat back 1 tilts forward, the seat cushion 2 moves forward toward the storage floor F in association with the forward tilt. At this time, as shown in FIG. 3, the under surface of the coupling member 5 slides (specifically glides) on the front end surface of the guide part 61 that inclines toward the storage floor F. Thus, the seat cushion 2 smoothly goes to the storage floor F being guided by the guide part 61.

As shown in FIGS. 2 and 6, when the seat state is in the seatable state, the guide part 61 of the present embodiment contacts the lower portion of the seat cushion 2 and supports the seat cushion 2. As described above, the guide part 61 guides the movement of the seat cushion 2 when the seat is stored, and supports the seat cushion 2 when the seat is used (when the occupant is seated on the seat). Thus, in the dive down type vehicle seat S, it is unnecessary to provide another member that supports the seat cushion 2 (e.g. the leg member of the conventional dive down type vehicle seat), and the number of seat components is reduced by that member.

Note that as shown in FIG. 2, when the seat state is in the seatable state, the guide part 61 of the present embodiment supports the seat cushion 2 at the position on the rear side from the front-to-back center of the seat cushion 2 (i.e., the guide part 61 contacts the lower portion of the seat cushion 2). In the seat cushion 2, the part on the rear side from the front-to-back center is a part on which the buttocks or the thighs of the occupant are placed when the occupant is seated on the vehicle seat S. Therefore, the guide part 61 supports the rear part of the seat cushion 2, and thus the seat cushion 2 can be supported more stably when the seat is used.

The guide part 61 has a first guide part 61L and a second guide part 61R that are disposed at positions separated from each other in the seat width direction. The first guide part 61L is provided at the end portion on the vehicle outer side in the both end portions of the vehicle seat S in the seat width direction. The second guide part 61R is provided at the end portion on the vehicle inner side. The first guide part 61L and the second guide part 61R both form a part of the base cover 60. In other words, both of the first guide part 61L and the second guide part 61R are integrated as one component. In other words, the base cover 60 corresponds to a component that forms the first guide part 61L and the second guide part 61R.

Note that the first guide part 61L and the second guide part 61R are disposed in bilateral symmetry from the seat width center of the base cover 60, and are in a form of the guide part 61 as described above.

When the seat state is in the seatable state, both of the first guide part 61L and the second guide part 61R contact the lower portion of the seat cushion 2, and support the seat cushion 2. As described above, the seat cushion 2 is supported by the right and left a pair of the guide part 61, and thus the support state of the seat cushion 2 when the seat is used can be more stabilized. Note that the number of the guide parts 61 is not limited, more specifically, and at least one or more guide parts 61 only have to be provided.

The structure of the guide part 61 will be described more in detail. The guide parts 61 (the first guide part 61L and the second guide part 61R) are composed of the protruding part formed at the seat width end portion of the base cover 60 that is a resin molded component. As shown in FIG. 9, the guide parts 61 are formed in a hollow body shape. That is, on the inner side of the protruding part that constitutes the guide part 61, a cavity V is provided.

As shown in FIG. 9, in the present embodiment, on the inner wall surface that surrounds the cavity V formed on the inner side of the guide parts 61, a reinforcement rib is provided. This rib is a boss-shaped rib that extends from a part located at the top end downward in the inner wall surface that surrounds the cavity V which is formed on the inner side of the guide part 61 (in the following, a boss-shaped rib 62). The lower end of the boss-shaped rib 62 extends to a position at which the lower end hits the top surface of the base bracket 41 of the support base 40. Such a boss-shaped rib 62 is provided, and thus the stiffness of the guide part 61 in a hollow body shape is improved. As a result, the guide part 61 appropriately supports the seat cushion 2 against the load of the seat cushion 2.

Note that the configuration that reinforces the guide part 61 is not limited to the configuration in which the boss-shaped rib 62 is provided. Example modifications shown in FIGS. 10 to 12 (in the following, a first example modification, a second example modification, and a third example modification) are thought. As shown in FIG. 10, in the first example modification, instead of providing the boss-shaped rib 62, a pair of projecting-shaped ribs 63 are provided. The projecting-shaped ribs 63 project from the inner wall surface that surrounds the cavity V formed on the inner side of the guide parts 61 to the inner side, and extend downward to a position at which the projecting-shaped ribs 63 hit the top surface of the base bracket 41.

As shown in FIG. 11, in the second example modification, an iron core 64 in a pillar-shaped is accommodated in the cavity V formed on the inner side of the guide parts 61. The iron core 64 corresponds to a reinforcement member that reinforces the upper end portion of the protruding part of the base cover 60 which forms the guide part 61. The iron core 64 is welded to the upper end surface of the base bracket 41, and extends upward. More specifically, the iron core 64 extends to a position at which the iron core 64 hits the upper end surface in the inner wall surface that surrounds the cavity V formed on the inner side of the guide parts 61.

As shown in FIG. 12, in the third example modification, instead of the iron core 64, a reinforcement wire 65 that is bent in a nearly inverted U-shape is accommodated in the cavity V in the guide part 61. The reinforcement wire 65 corresponds to a reinforcement member that reinforces the upper end portion of the protruding part of the base cover 60 which forms the guide part 61. The reinforcement wire 65 is welded to the upper end surface of the base bracket 41, and extends upward. More specifically, the reinforcement wire 65 extends to near the upper end surface in the inner wall surface that surrounds the cavity V, bends along the upper end surface, and extends downward to the base bracket 41. On the other hand, as shown in FIG. 12, from the upper end surface of the inner wall surface that surrounds the cavity V in the guide part 61, a nail-shaped holding part 66 is formed in projection. The holding part 66 engages with a part in the reinforcement wire 65 that extends along the upper end surface of the inner wall surface that surrounds the cavity V, and retains the reinforcement wire 65.

The other characteristics of the base cover 60 will be described. As shown in FIG. 6, in the base cover 60, the part that is located between the first guide part 61L and the second guide part 61R in the seat width direction is sunk (recessed) more downward from the first guide part 61L or the second guide part 61R, and a recess-shaped space is formed. This space forms a bag storage part 67. Thus, for example, during a period for which the seat state is in the seatable state or in the tip-up state, a bag having a slight height can be placed in the space that is located below the seat cushion 2 (in the bag storage part 67).

Next, the configuration of the guide part 61 will be described making a reference to the positional relationship of the guide part 61 with the peripheral devices.

As shown in FIG. 6, in the both end portions of the vehicle seat S in the seat width direction, the guide part 61 (strictly speaking, the second guide part 61R) is provided at the end portion on the vehicle inner side. As described above, the armrest 6 is provided at the end portion of the seat main body Sh on the vehicle inner side (strictly speaking, the side end portion of the seat back 1 on the vehicle inner side). In the present embodiment, as shown in FIG. 6, the second guide part 61R is disposed so as to cross the range in which the armrest 6 is provided in the seat width direction. In other words, at least a part of the armrest 6 is located on the vehicle outer side from the end of the second guide part 61R (the end on the vehicle inner side) in the seat width direction. With such a configuration, the degree of projection of the armrest 6 to the vehicle inner side can be suppressed due to the positional relationship with the second guide part 61R.

However, the second guide part 61R may be disposed at a position out of the range in which the armrest 6 is provided in the seat width direction, with no limitation to the positional relationship. More specifically, the armrest 6 may be located on the vehicle inner side from the second guide part 61R.

As shown in FIG. 6, in the both end portions of the vehicle seat S in the seat width direction, the guide part 61 (strictly speaking, the first guide part 61L) is provided at the end portion on the vehicle outer side, and the operation strap 8 that is operated to unlock the locking of the slide rail mechanism 4 is provided. In the present embodiment, as shown in FIG. 6, the operation strap 8 is disposed so as to cross the range in which the first guide part 61L is provided in the seat width direction. More specifically, in the front end surface of the first guide part 61L, at the up-to-down center portion, an opening 61a in an oblong rectangular shape is formed shown in FIG. 8. Into this opening 61a, the operation strap 8 is inserted, a part of the operation strap 8 is accommodated in the base cover 60, and the remaining part is located on the front side from the opening 61a and exposed. The operation strap 8 is operated by pulling the exposed part forward by the occupant.

With the configuration described above, as a result of setting the disposition position of the operation strap 8 in consideration of the disposition position to the first guide part 61L, the size of the vehicle seat S that includes the operation strap 8 can be made more compact.

Note that the operation strap 8 may be disposed at a position out of the range in which the first guide part 61L is provided in the seat width direction, with no limitation to the positional relationship. More specifically, the operation strap 8 may be located on the vehicle inner side from the first guide part 61L.

As shown in FIG. 6, in the both end portions of the vehicle seat S in the seat width direction, the guide part 61 (strictly speaking, the second guide part 61R) is provided at the end portion on the vehicle inner side as well as the seat belt wearing buckle 7 is provided. In the present embodiment, as revealed from FIGS. 6 and 8, the second guide part 61R is disposed at a position out of the range in which the buckle 7 is provided in the seat width direction. Specifically, the second guide part 61R is disposed on the vehicle outer side from the buckle 7. More specifically, as shown in FIG. 8, at the part that is located on the vehicle inner side from the second guide part 61R in the base cover 60, a slit-shaped insertion hole 68 that extends along the front to back direction is provided. Into this insertion hole 68, the support bracket 7a of the buckle 7 is inserted. The buckle 7 (strictly speaking, the support bracket 7a) rotates within the range in which the insertion hole 68 is formed. In other words, in the present embodiment, the buckle 7 is disposed at a position shifted from the second guide part 61R, and rotates on the vehicle inner side from the second guide part 61R.

With the positional relationship describe above, the second guide part 61R can be appropriately disposed while the interference with the buckle 7 is suppressed.

However, the second guide part 61R may be disposed so as to cross the range in which the buckle 7 is provided in the seat width direction, with no limitation to the positional relationship.

So far, the configuration of the conveyance seat according to the present invention is described taking examples. However, the foregoing embodiment is merely an example, and another embodiment is also thought. For example, in the foregoing embodiment, the vehicle seat S is not locked in the seatable state, and is movable. However, the vehicle seat S is not limited to this. A configuration may be thought in which the seat cushion 2 is locked when the seat state is in the seatable state (in the following, another embodiment). In the following, another embodiment will be described.

Figure 13:
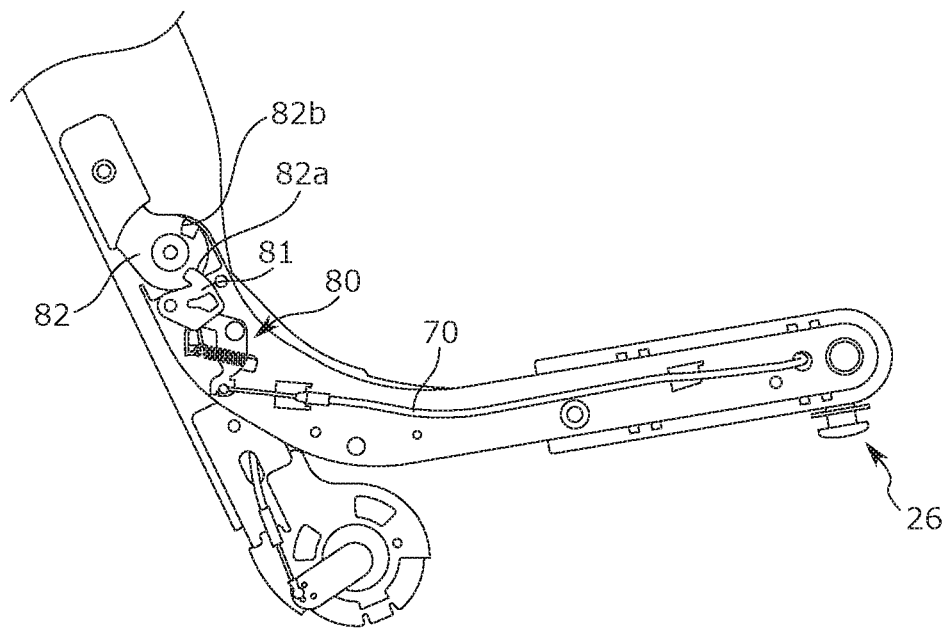
FIG. 13 is a view showing a cushion locking device included in a conveyance seat according to another embodiment.
Figure 13:
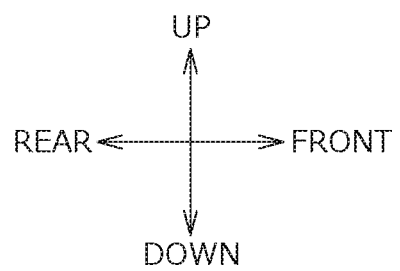

A vehicle seat S according to another embodiment includes a cushion locking device 80 shown in FIG. 13 at both seat width end portions. FIG. 13 is a lateral cross sectional view showing the cushion locking device 80 of the vehicle seat S according to another embodiment.

The cushion locking device 80 locks a seat cushion 2 at a position at that point in time when the seat state is in the seatable state. when the seat state is in the tip-up state, the cushion locking device 80 locks the seat cushion 2 at a position at that point in time. Similarly to the cushion locking device 25 of the foregoing embodiment, the cushion locking device 80 is provided at the rear end portion of a coupling member main body part 5a. The cushion locking device 80 is in a publicly known structure (the structure of a typical cushion locking device), and the cushion locking device 80 can switch the state between the locked state and the unlocked state.

Similarly to the cushion locking device 25 of the foregoing embodiment, the cushion locking device 80 operates by operating a damper 26 that projects from the under surface of the seat cushion 2. Specifically, the damper 26 is coupled to the cushion locking device 80 through a cable 70. In such a configuration, when in the cushion locking device 80, a locking piece 81 that is mounted on a coupling member 5 engages with the engagement hole of an engagement member 82 that is mounted on a seat back 1 (specifically, any of a first engagement hole 82a and a second engagement hole 82b), the seat cushion 2 is locked at the position at the point in time. Note that when the seat state is in the seatable state, the locking piece 81 is engaged with the first engagement hole 82a, and when the seat state is in the tip-up state, the locking piece 81 is engaged with the second engagement hole 82b.

The damper 26 is slidably moved when the seat cushion 2 is locked, the cable 70 that is connected to the damper 26 is pulled, and the components of the cushion locking device 80 operate. As a result, the locking piece 81 is released from the engagement hole, and the locking of the seat cushion 2 is unlocked.

Figure 14:
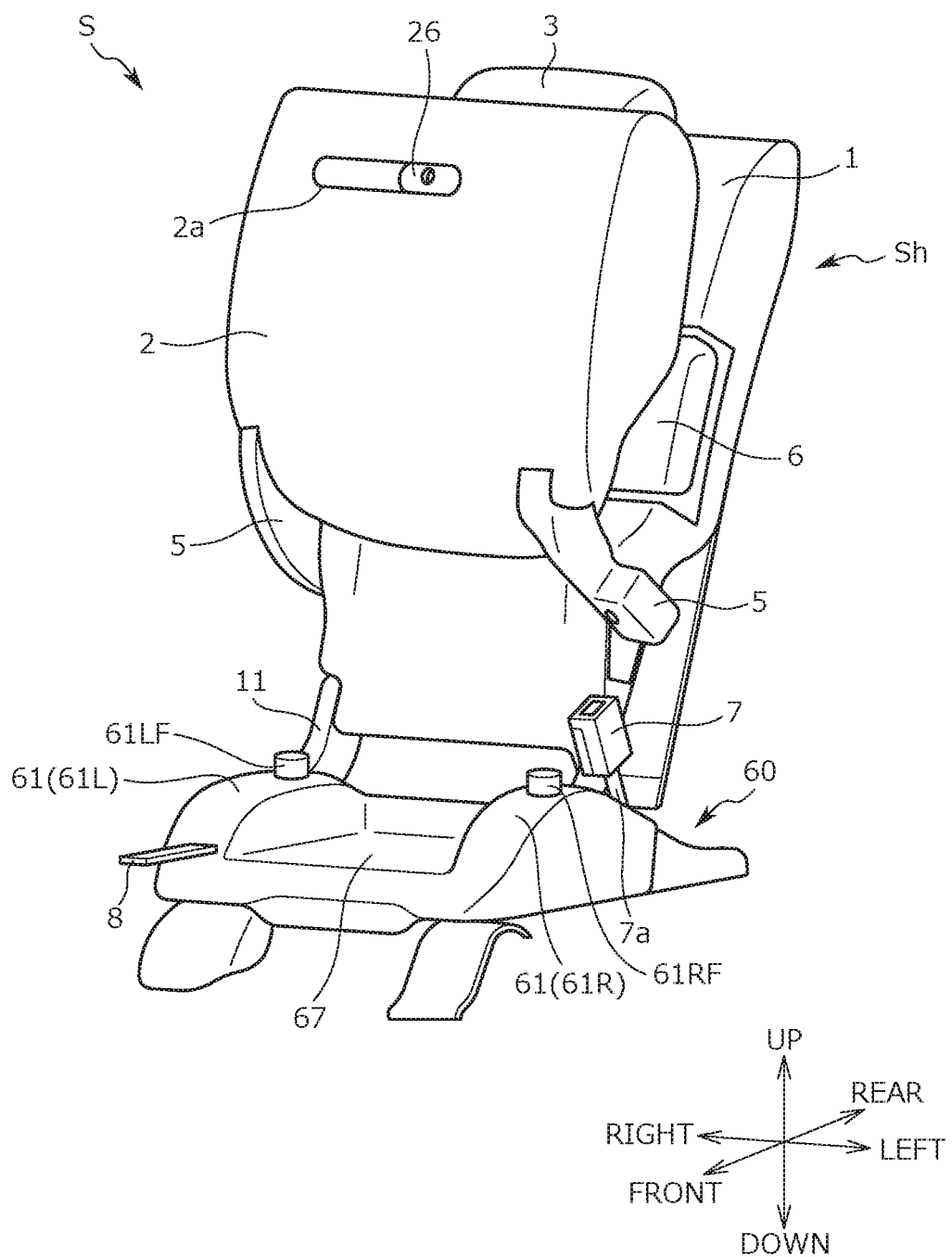
FIG. 14 is a perspective view of a conveyance seat according to an example modification is in a tilt-up state.

As shown in FIG. 14, a part of a base cover 60 is cut, and a configuration may be provided in which cushion frames 61LF and 61RF that support the lower portion of the seat cushion 2 (specifically, the top portion of the base bracket 41) are exposed. According to such a configuration, the seat cushion 2 can be appropriately and stably supported with the cushion frames 61LF and 61RF of high stiffness.

Vehicle Seat According to a Second Embodiment

Next, a vehicle seat according to a second embodiment will be described. In the description of the vehicle seat according to the second embodiment, problems on the conveyance seat will be described.

A conveyance seat that can switch the state from the seatable state to the storage state or the tip-up state is already known. For example, JP 2016-88481 describes a conveyance seat mainly composed of a seat back, a seat cushion, a seat main body having a headrest, a leg member (detachable leg) that supports the seat main body from below, a support base that supports the leg member from below, a leg retaining member that is mounted on the support base and that detachably retains the lower end of the leg member, and a base cover that covers the support base from above.

Problems that are to be Solved by the Conveyance Seat According to the Second Embodiment In regard to the conveyance seat, it is desired to reduce the number of seat components. Therefore, with the removal of the leg member, it is desired to compose the conveyance seat that can switch the state between the seatable state and the storage state or the tip-up state using a much smaller number of components (specifically, the number smaller than the number of the conventional components of the conveyance seat having a leg member) or it is desired to simplify the structure.

Since the leg member has a function that retains a load from the seat cushion side, in the case in which the leg member is removed, the function that retains a load from the seat cushion side has to be compensated by another structure.

In accordance with the conveyance seat according to the second embodiment, the problems are solved by a conveyance seat including a seat back and a seat cushion, the conveyance seat including: a seat main body being operable to switch a state between a seatable state in which the seat back is erected to a car body floor to allow seated occupant to be seated on the seat cushion, a storage state in which the seat back tilts down to the car body floor and the seat cushion is disposed between the seat back and the car body floor, and a tip-up state in which the seat back is erected to the car body floor and the seat cushion tilts up toward the seat back; a rotating shaft that rotatably supports the seat back to the car body floor side; and a cover member that covers the rotating shaft. In the seatable state, the cover member supports the seat cushion.

In the conveyance seat configured as described above, the conveyance seat that can switch the state between the seatable state and the storage state or the tip-up state can be provided in a simple structure.

Since the leg member has the function that retains the load which is applied from the rear side to the seat back, in the case in which the leg member is removed, the function that retains the load which is applied from the rear side to the seat back has to be compensated by another structure.

In accordance with the conveyance seat according to the second embodiment, the problem is solved by a conveyance seat including a seat back and a seat cushion, the conveyance seat including: a seat main body being operable to switch a state between a seatable state in which the seat back is erected to a car body floor to allow seated occupant to be seated on the seat cushion and a tip-up state in which the seat back is erected to the car body floor and the seat cushion tilts up toward the seat back; a rotating shaft that rotatably supports the seat back to the car body floor side; and a cover member that covers the rotating shaft. The seat back includes a back frame having a pair of right and left back side frames that extend in an up to down direction of the conveyance seat. The seat cushion includes a cushion frame having a pair of right and left cushion side frames that extend in the up to down direction of the conveyance seat. The seat back includes a reclining device that can lock the seat back in the seatable state on one side of the back side frame. Another side of the back side frame is configured as a free hinge to the car body floor. In the seatable state, the cover member supports the seat cushion. The seat cushion includes a tip-up locking device that locks the seat cushion in the tip-up state on the other side of the cushion side frame.

In the conveyance seat configured as described above, when a large load is applied from the rear side to the seat back frame in the seatable state, on the one side, the reclining device retains the load, and on the other side, the seat back and the seat cushion are locked by the tip-up locking device. The seat back frame is the free hinge. Thus, the under surface side of the seat cushion contacts the cover member to retain the load.

In the conveyance seat according to the second embodiment described below, the rotating shaft may include a first rotating shaft that is provided on one side of the back side frame and a second rotating shaft that is provided on another side of the back side frame. The cover member may integrally cover the first rotating shaft and the second rotating shaft.

In the configuration, the seat cushion can be stably supported.

In the conveyance seat according to the second embodiment described below, the conveyance seat may include a slide rail mechanism that slidably moves the seat main body along a front to back direction of the conveyance seat. The cover member may include a first protruding part and a second protruding part that protrude upward at both end portions of the conveyance seat in a width direction. In the seatable state, the first protruding part and the second protruding part may contact the seat cushion. In a width direction of the conveyance seat, the first protruding part and the second protruding part may be disposed on an outer side from the slide rail mechanism.

In the configuration, the seat cushion can be stably supported.

In the conveyance seat according to the second embodiment described below, the cover member may be formed of a front-side cover member that is disposed forward in a front to back direction of the conveyance seat and a rear-side cover member that is connected to a rear side of the front-side cover member. The front-side cover member may be connected to the rear-side cover member at a fitting part. The fitting part may be provided on a rear side from the first protruding part and the second protruding part.

In the configuration, the first protruding part and the second protruding part are disposed on the rear side from the fitting part, no fitting part is provided on the part that supports a load, and thus the load can be efficiently supported.

In the conveyance seat according to the second embodiment described below, a center portion of the seat cushion in a front to back direction of the conveyance seat (specifically, the hip point of a seated occupant) may be disposed forward from the first protruding part and the second protruding part.

In the configuration, the seat back tilts forward without using an additional biasing member, and thus an increase in the number of parts can be suppressed.

In the conveyance seat according to the second embodiment described below, the seat cushion may include a slide rail operating lever that slidably moves the seat main body. The slide rail operating lever may rotate from above to downward.

In the configuration, the tipping up of the seat cushion when the slide rail operating lever is operated can be suppressed.

In the conveyance seat according to the second embodiment described below, the seat cushion may include an ottoman. The cover member may include a recess that accommodates an article. The ottoman may cover a front side of the recess when viewed from a front surface of the conveyance seat.

In the configuration, the recess in which an article is accommodated can be hidden.

Effect of the Conveyance Seat According to the Second Embodiment

As described above, in accordance with the conveyance seat according to the second embodiment described below, the conveyance seat that can switch the state between the seatable state and the storage state or the tip-up state can be provided in a simple structure.

Further, in accordance with the conveyance seat according to the second embodiment described below, when a large load is applied from the rear side to the seat back frame in the seatable state, on the one side, the reclining device retains the load, on the other side, the seat back and the seat cushion are locked by the tip-up locking device, and the seat back frame is a free hinge. Thus, the under surface side of the seat cushion contacts the cover member to retain the load.

Further, in accordance with the conveyance seat according to the second embodiment described below, in the configuration, the seat cushion can be stably supported.

Further, in accordance with the conveyance seat according to the second embodiment described below, the seat cushion can be stably supported.

Further, in accordance with the conveyance seat according to the second embodiment, the first protruding part and the second protruding part are disposed on the rear side from the fitting part, no fitting part is provided on the part that supports a load, and thus the load can be efficiently supported.

Further, in accordance with the conveyance seat according to the second embodiment described below, the seat back tilts forward without using an additional biasing member, and thus an increase in the number of parts can be suppressed.

Further, in accordance with the conveyance seat according to the second embodiment described below, the tipping up of the seat cushion when the slide rail operating lever is operated can be suppressed.

Further, in accordance with the conveyance seat according to the second embodiment described below, the recess in which an article is accommodated can be hidden.

In the following, a vehicle seat S2 of the second embodiment will be described with reference to FIGS. 15 to 29. Note that the description of the content that overlaps with the vehicle seat S according to the first embodiment is omitted. In the illustrations of the second embodiment, devices and components that overlap with the example configurations described above are designated with the same reference signs as the reference signs used in the example configurations described above.

Basic Configuration of the Vehicle Seat according to the Second Embodiment

Figure 15:
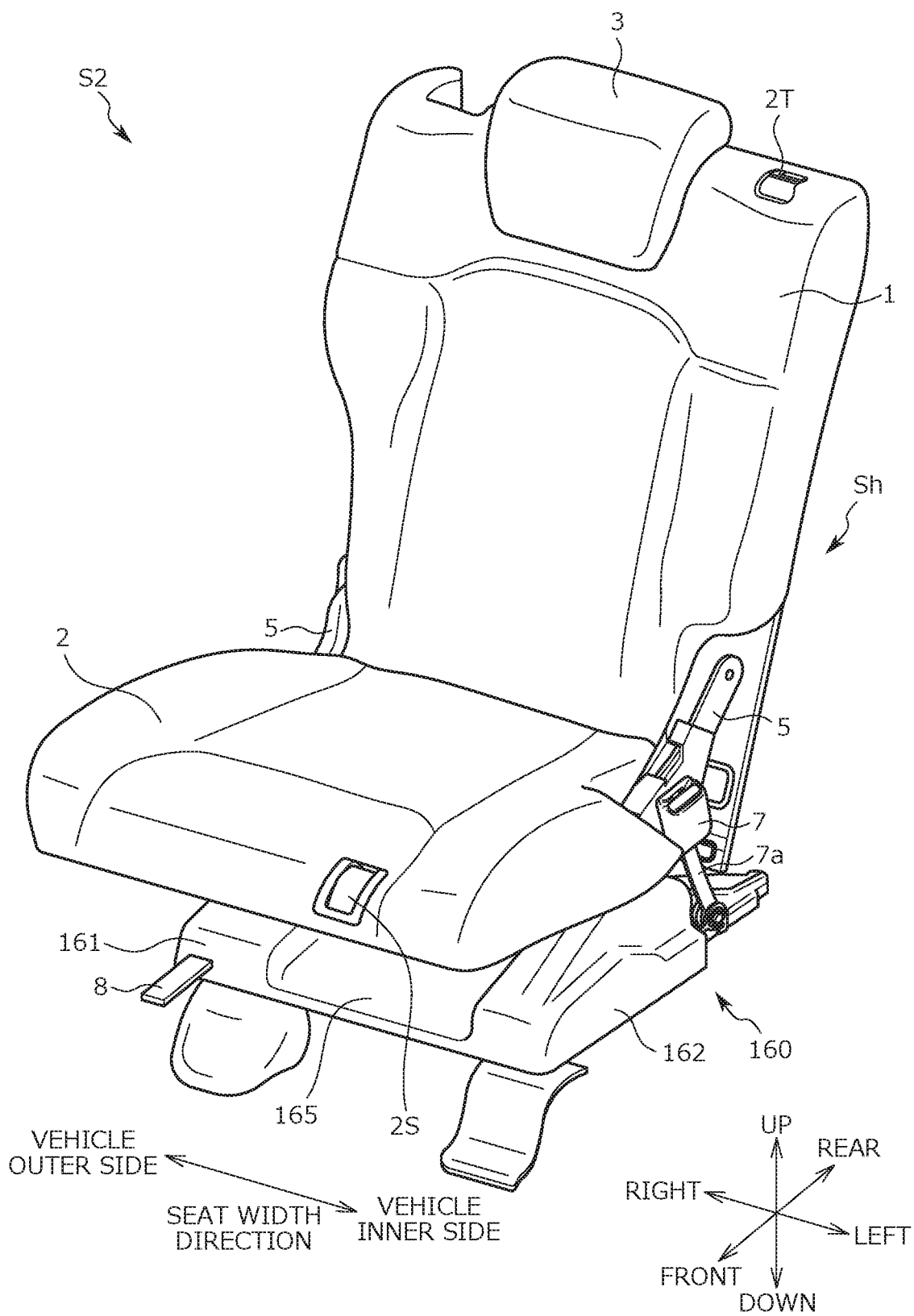
FIG. 15 is a perspective view of a conveyance seat according to a second embodiment of the present invention.

The basic configuration of the vehicle seat according to the second embodiment (in the following, the vehicle seat S2) will be described with reference to FIG. 15. FIG. 15 is a perspective view of the vehicle seat S2.

As shown in FIG. 15, the vehicle seat S2 includes a seat main body Sh. The seat main body Sh includes a seat back 1 and a seat cushion 2. As shown in FIG. 7 that is already described, at the rear end portion of a coupling member 5, a cushion locking device 25 that is a locking device is mounted. The cushion locking device 25 is disposed at the position sandwiched between the coupling member 5 and the lateral end of a seat back frame 10 in the seat width direction. The cushion locking device 25 locks the seat cushion 2 at a position at that point in time when the seat state is in the seated state. The cushion locking device 25 locks the seat cushion 2 at a position at that point in time when the seat state is in the tip-up state. As described in detail below, the cushion locking device 25 can switch the state between the locked state and the unlocked state.

As shown in FIG. 15, in the vehicle seat S2, the seat cushion 2 includes a slide rail operating lever 2S that slidably moves the seat main body Sh. The slide rail operating lever 2S is configured to rotate from above to downward when the state is in the seated state. According to such a configuration, the tipping up of the seat cushion 2 when the slide rail operating lever 2S is operated can be suppressed.

In the example shown in FIG. 15, a reclining operating lever 2T that tilts the seat cushion 2 is provided on the shoulder on the vehicle inner side of the seat back 1. The reclining operating lever 2T is connected to a cable, not shown, the reclining operating lever 2T is operated to pull the corresponding cable, and locking is unlocked. Thus, the tilting (reclining) of the seat cushion 2 is made possible. The reclining operating lever 2T is operated in the direction in which the lever is lifted to the rear side and upward.

Figure 16:
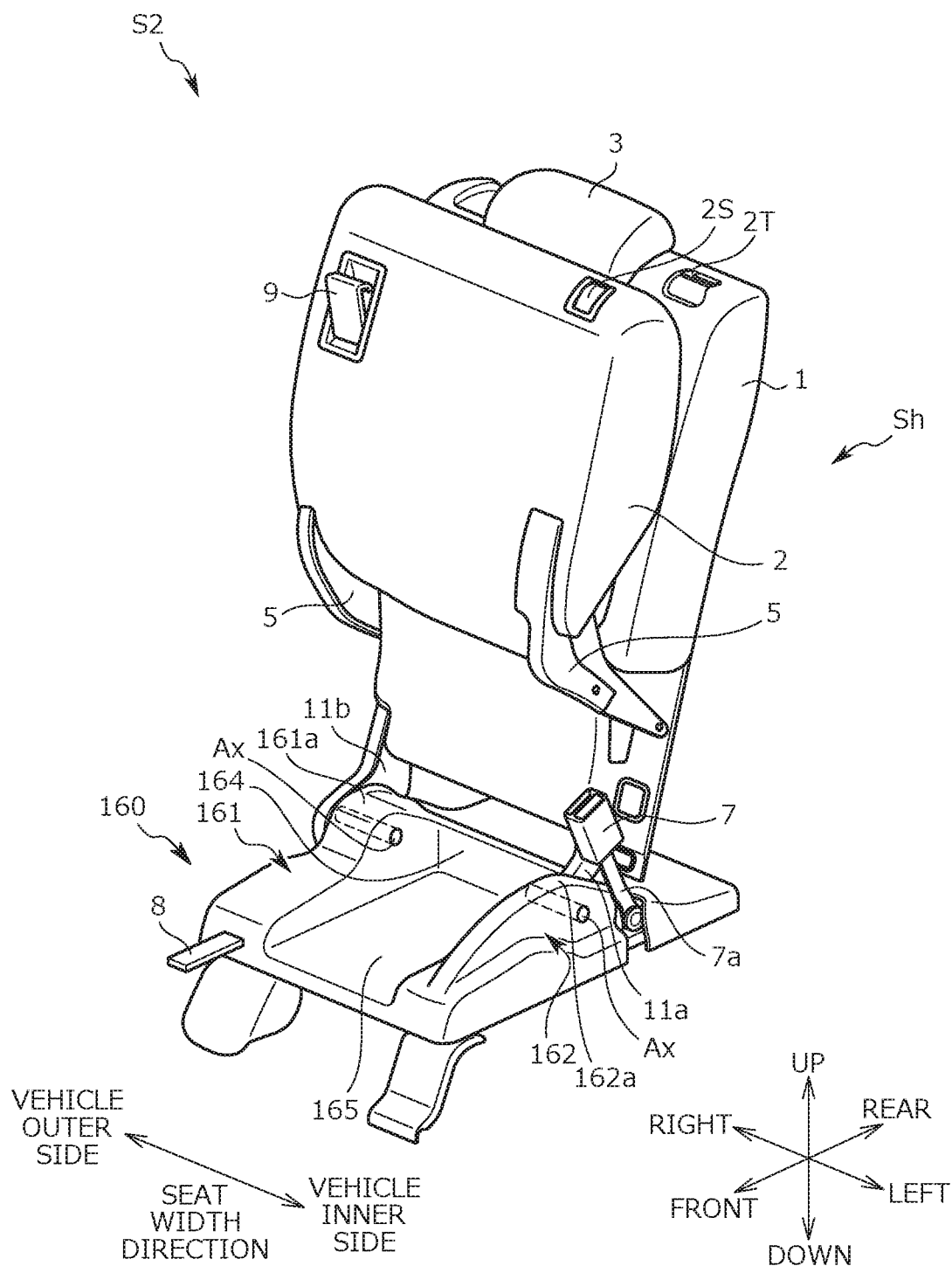
FIG. 16 is a perspective view of the conveyance seat when the seat state is in a tip-up state.

As shown in FIG. 16, on the under surface of the seat cushion 2, a convenient hook 9 is provide. The provision of the convenient hook 9 on the under surface of the seat cushion 2 enables hanging the handles of a sack on the convenient hook 9 when a bag in the sack is placed on a bag accommodation recess 165, described later, in the tip-up state. Hanging the handles of the sack on the convenient hook 9 enables suspending the sack including the bag.

(Base Cover 160)

Abase cover 160 is a resin molded component that covers a support base 40 entirely and a slide rail mechanism 4 from above. In the present embodiment, the base cover 160 includes a function that guides the movement of the seat cushion 2 when the seat state is switched in addition to the function that covers the support base 40 and the slide rail mechanism 4. As described later, the base cover 160 includes the bag accommodation recess 165 that accommodates an article, such as a bag.

Figure 17:
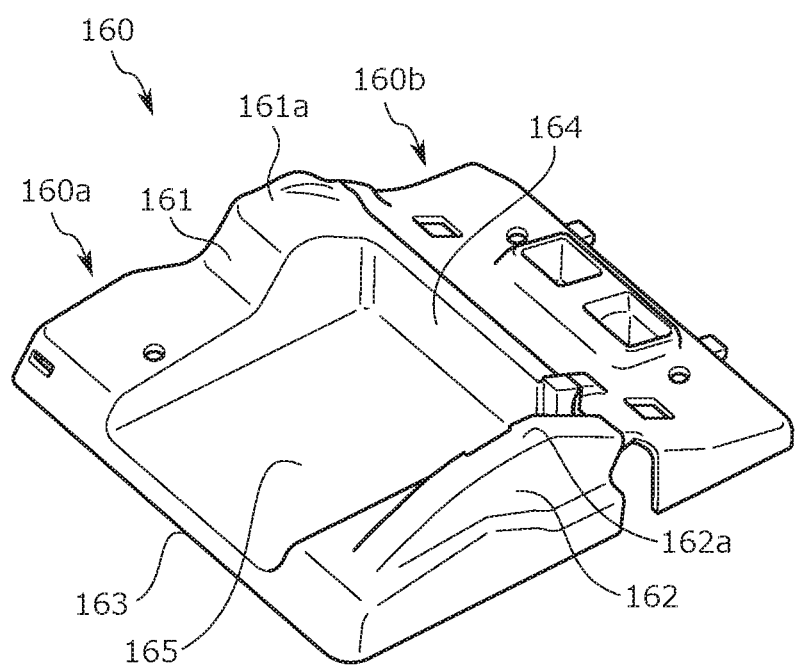
FIG. 17 is a perspective view of a base cover included in the conveyance seat according to the second embodiment of the present invention.
Figure 17:
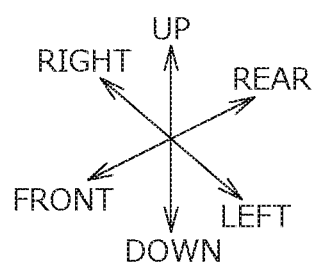
Figure 18:
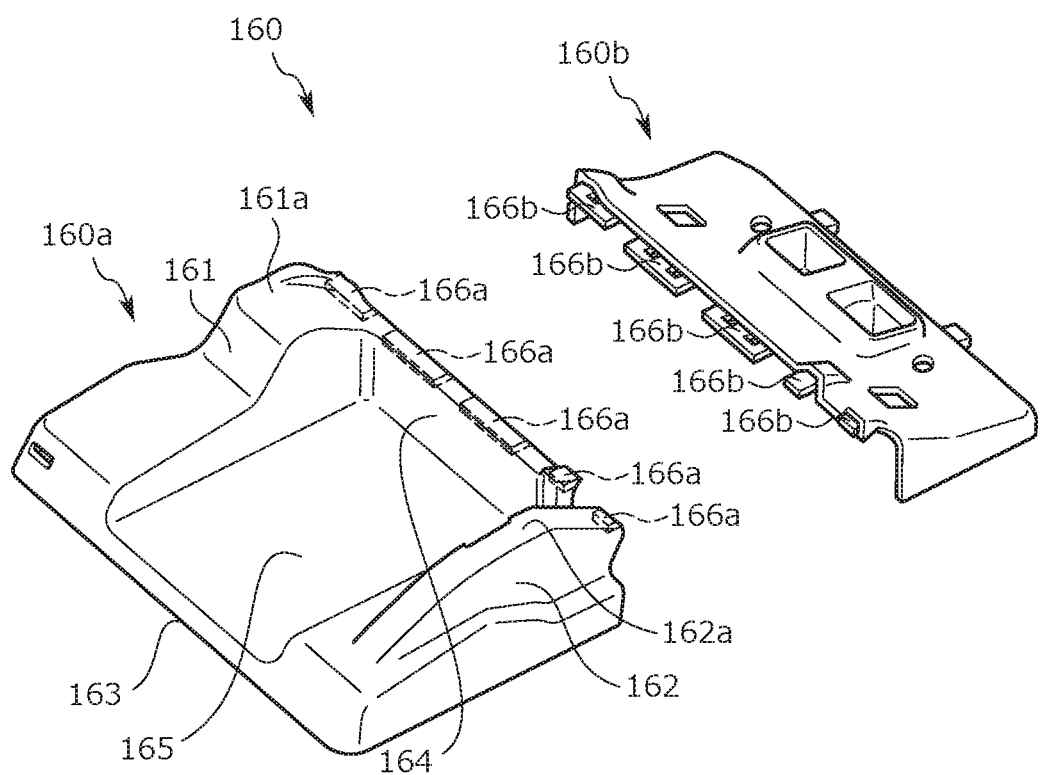
FIG. 18 is a perspective view in a state in which the base cover is separated into a front-side cover and a rear-side cover.
Figure 18:
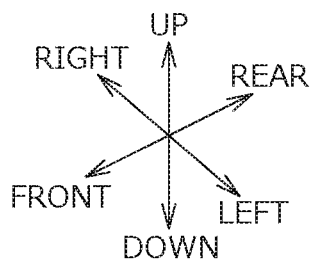

The base cover 160 is in an outer shape shown in FIGS. 16 and 17, and is placed on a car body floor. The base cover 160 bulges above overall, and on its inner side, a space enough to accommodate the support base 40 and the slide rail mechanism 4 is formed. As shown in FIGS. 17 and 18, the base cover 160 of the present embodiment is split into a front-side base cover 160a and a rear-side base cover 160b and composed of the front-side cover 160a and the rear-side cover 160b.

As shown in FIGS. 16 and 17, at the both seat width end portions of the base cover 160, a first protruding part 161 and a second protruding part 162 that protrude upward from the other parts are formed. The first protruding part 161 includes a top portion 161a at a position corresponding to the top portion of a base bracket 41 on the right side. The second protruding part 162 includes a top portion 162a at a position corresponding to the top portion of the base bracket 41 on the left side. The second protruding part 162 constitutes a guide part, and is provided so as to widen from the front end to the rear end of the base cover 160 along the front to back direction. At the rear end portion of the base cover 160, a front part 163 and a rear side projecting part 164 that project upward from the front part 163 and the bag accommodation recess 165 are formed.

As shown in FIGS. 16 and 17, the second protruding part 162 is in a nearly mountain shape when viewed from the lateral side, and its upper end surface is a plane that projects upward and curves so as to form an arc. The front end surface of the second protruding part 162 is an inclined plane, and on its extension line, a storage floor F is disposed. The second protruding part 162 has a slight spread (breadth) in the seat width direction.

The second protruding part 162 configured as described above slidably contacts a part of the seat main body Sh in the transition of the seat state to the storage state, and thus guides the movement of the seat back 1 and the seat cushion 2. More specifically, in the transition of the seat state to the storage state, when the seat back 1 tilts forward, the seat cushion 2 moves forward toward the storage floor F in association with the forward tilt. At this time, the under surface of the coupling member 5 slides (specifically glides) on the front end surface of the second protruding part 162 that inclines toward the storage floor F. Thus, the seat cushion 2 smoothly goes to the storage floor F being guided by the second protruding part 162.

As shown in FIG. 17, in the base cover 160, a part that is located between the first protruding part 161 and the second protruding part 162 in the seat width direction and located between the front part 163 and the rear side projecting part 164 in the front to back direction is sunk (recessed) downward from the first protruding part 161 or the second protruding part 162, and a recess-shaped space is formed. This space constitutes the bag accommodation recess 165. Thus, for example, during a period for which the seat state is in the seated state or in the tip-up state, a bag having a slight height can be placed in the space located below the seat cushion 2 (in the bag accommodation recess 165).

As shown in FIG. 18, the base cover 160 is integrated in which an engagement protrusion 166b that is formed at the front end portion of the rear-side base cover 160b is fit into an engagement recess 166a that is formed on the rear side projecting part 164 which is the rear end portion of the front-side base cover 160a. Here, the engagement recess 166a is provided on the rear side projecting part 164 that constitutes the rear end portion of the bag accommodation recess 165 of the front-side base cover 160a, and thus the rear-side base cover 160b can be fit at a place where stiffness is improved.

As shown in FIGS. 17 and 18, in the base cover 160 in the seat front to back direction, the engagement recess 166a and the engagement protrusion 166b that constitute the fitting part are provided on the rear side from the first protruding part 161 and the second protruding part 162. According to such a configuration, the first protruding part 161 and the second protruding part 162 are disposed on the rear side from the fitting part, no fitting part is provided on the part that supports a load, and thus the load can be efficiently supported. More specifically, also when an occupant sinks in a rear-end collision, a load due to the sinking of the occupant can be supported by the first protruding part 161 and the second protruding part 162.

As shown in FIG. 16, the base cover 160 integrally covers a rotating shaft Ax that rotatably supports the seat back 1 to the car body floor side, more specifically, the rotating shaft Ax (a first rotating shaft and a second rotating shaft) of a coupling link 11 (a coupling link 11a and a coupling link 11b) that is a back side frame. Here, the rotating shaft Ax is a shaft that rotatably supports the seat back 1 to the car body floor side. In the vehicle seat S2, in the seatable state, the base cover 160 supports the seat cushion 2.

In the conventional vehicle seat, the leg member that retains a load from the seat cushion side is present. However, in the vehicle seat S2, without providing the leg member, the base cover 160 that is a cover member which covers the rotating shaft Ax retains a load from the seat cushion 2 side. Therefore, according to the vehicle seat S2, a conveyance seat that can switch the state between the seatable state and the storage state or the tip-up state can be provided in a simple structure.

In the vehicle seat S2, the seat back 1 includes a reclining device 13 that can lock the seat back 1 in the seatable state on one side of the back side frame (the coupling link 11b on the right side) (FIG. 7). The other side (the coupling link 11a on the left side) of the back side frame is mounted using a free hinge to the car body floor. The seat cushion 2 includes a cushion locking device 25 (FIG. 13) that is a tip-up locking device which locks the seat cushion in the tip-up state on the other side of the cushion side frame, i.e., on a coupling member main body part 5a on the left side.

In the vehicle seat S2, when a large load is applied from the rear side to the seat back frame 10 in the seatable state, the load is retained by the reclining device 13 on one side (the coupling link 11b on the right side), and the other side (the coupling link 11a on the left side) is mounted on the car body floor by the free hinge, and the seat back 1 and the seat cushion 2 are locked by the cushion locking device 25. Thus, the under surface side of the seat cushion 2 contacts the base cover 160, and the load can be retained.

Figure 19:
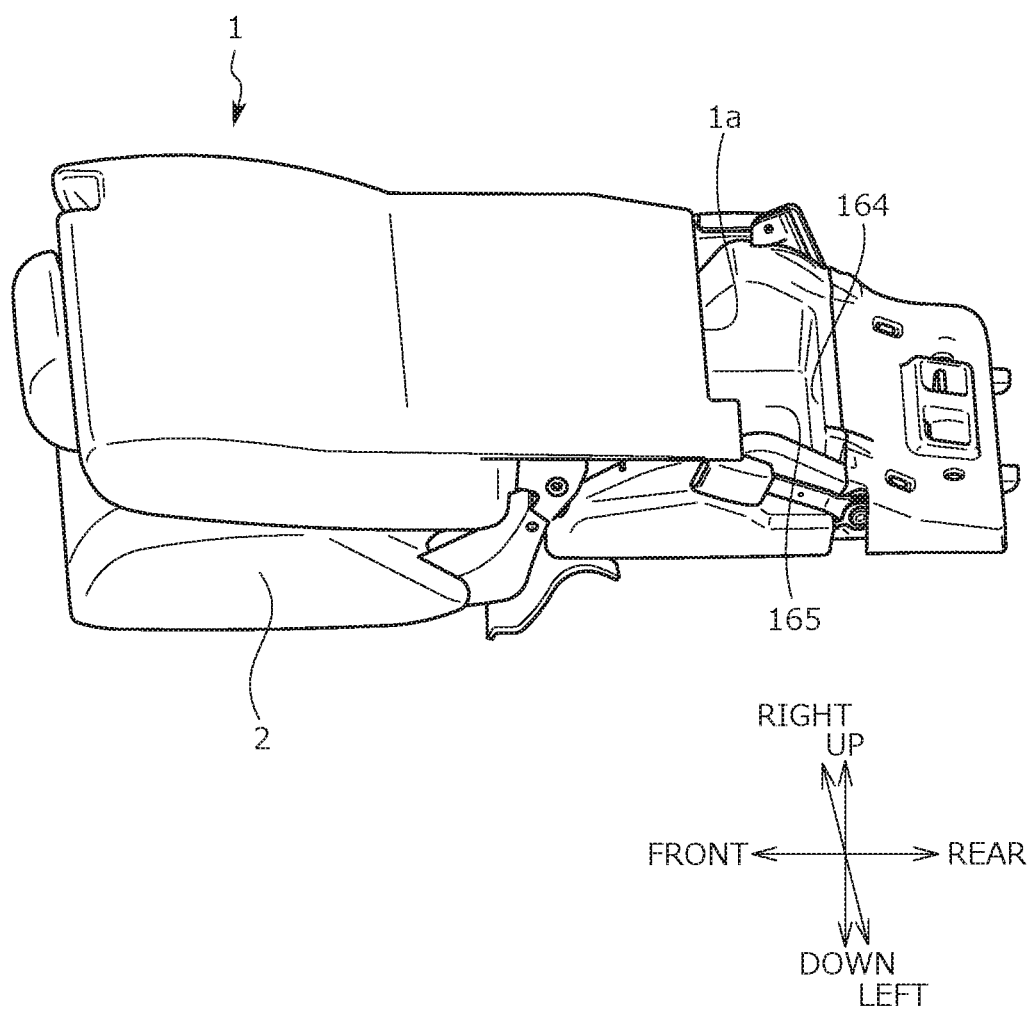
FIG. 19 is a perspective view of the conveyance seat when the seat state is in a storage state.
Figure 20:
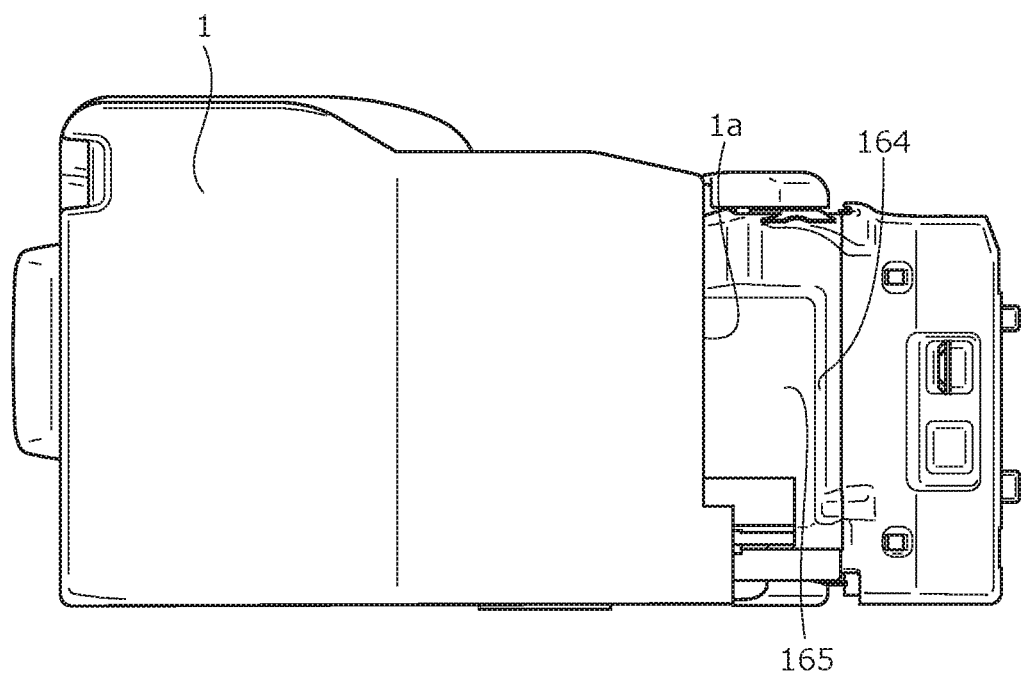
FIG. 20 is a top view of the conveyance seat when the seat state is in a storage state.
Figure 20:
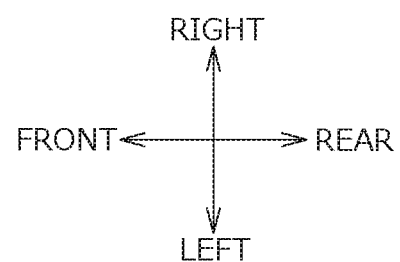

As shown in FIGS. 19 and 20, in the vehicle seat S2, when the seat state is in the storage state, the bag accommodation recess 165 is disposed on the rear side from the rear end portion 1a at the seat width center portion of the seat back 1. More specifically, in the vehicle seat S2, when the seat state is in the storage state, in the seat front to back direction, the rear end portion 1a at the seat width center portion of the seat back 1 is disposed forward from the rear side projecting part 164 that is the rear end of the bag accommodation recess 165. According to such a configuration, also when the seat state is in the storage state, a bag can be accommodated in the bag accommodation recess 165 (strictly speaking, the rear side part of the bag accommodation recess 165).

Figure 21:
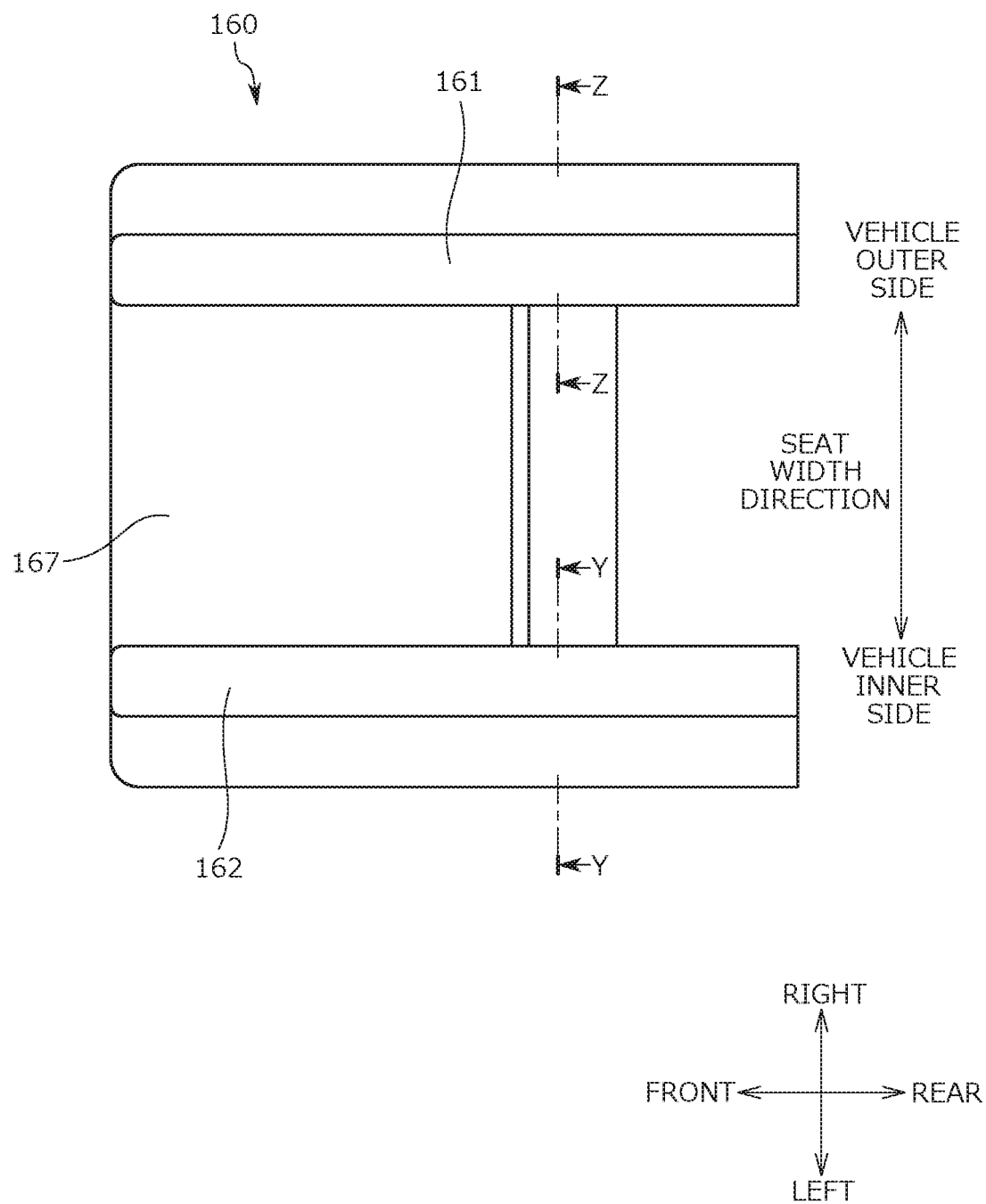
FIG. 21 is a view of the base cover when viewed from above.
Figure 22:
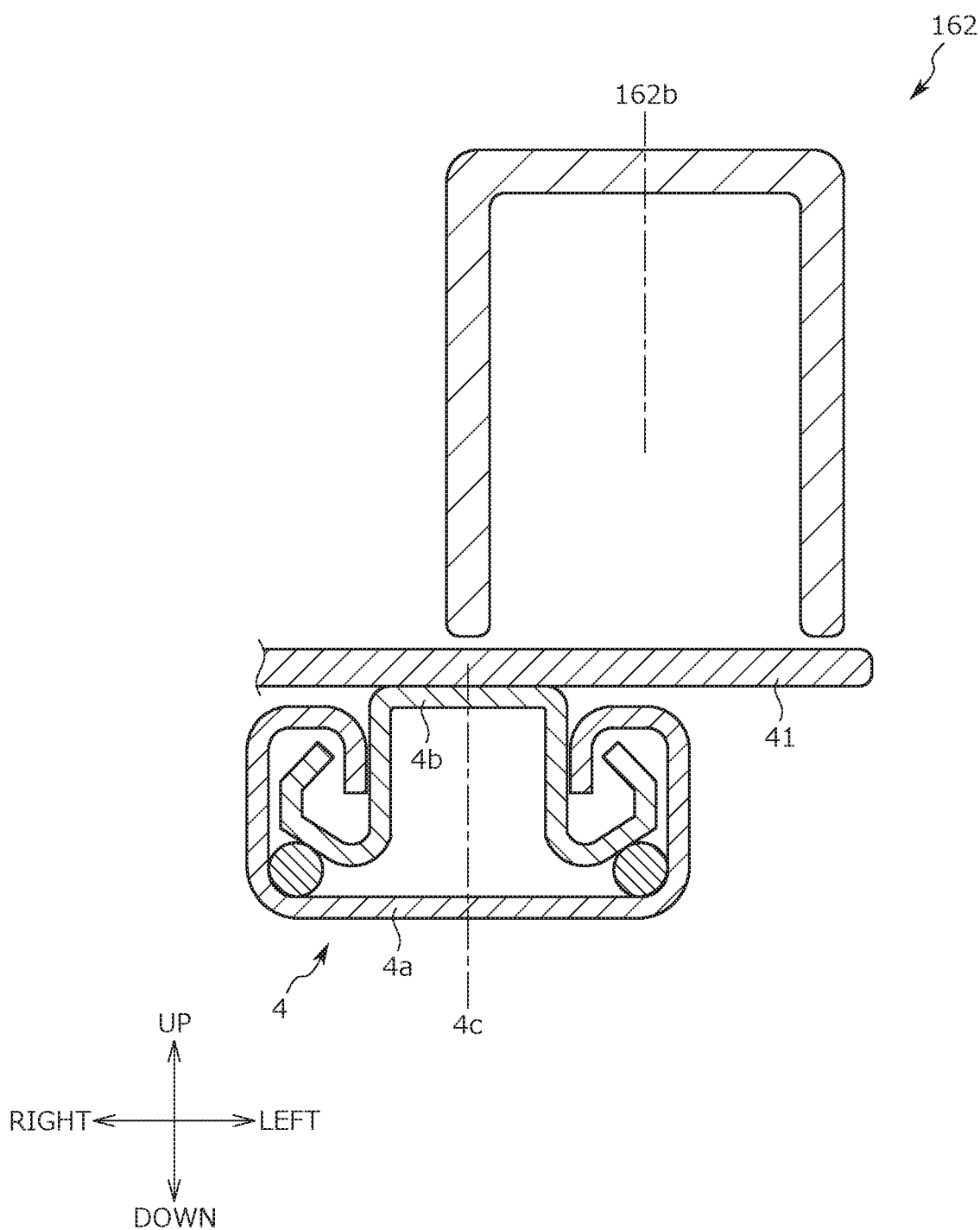
FIG. 22 is a Y-Y cross sectional view in FIG. 21.
Figure 23:
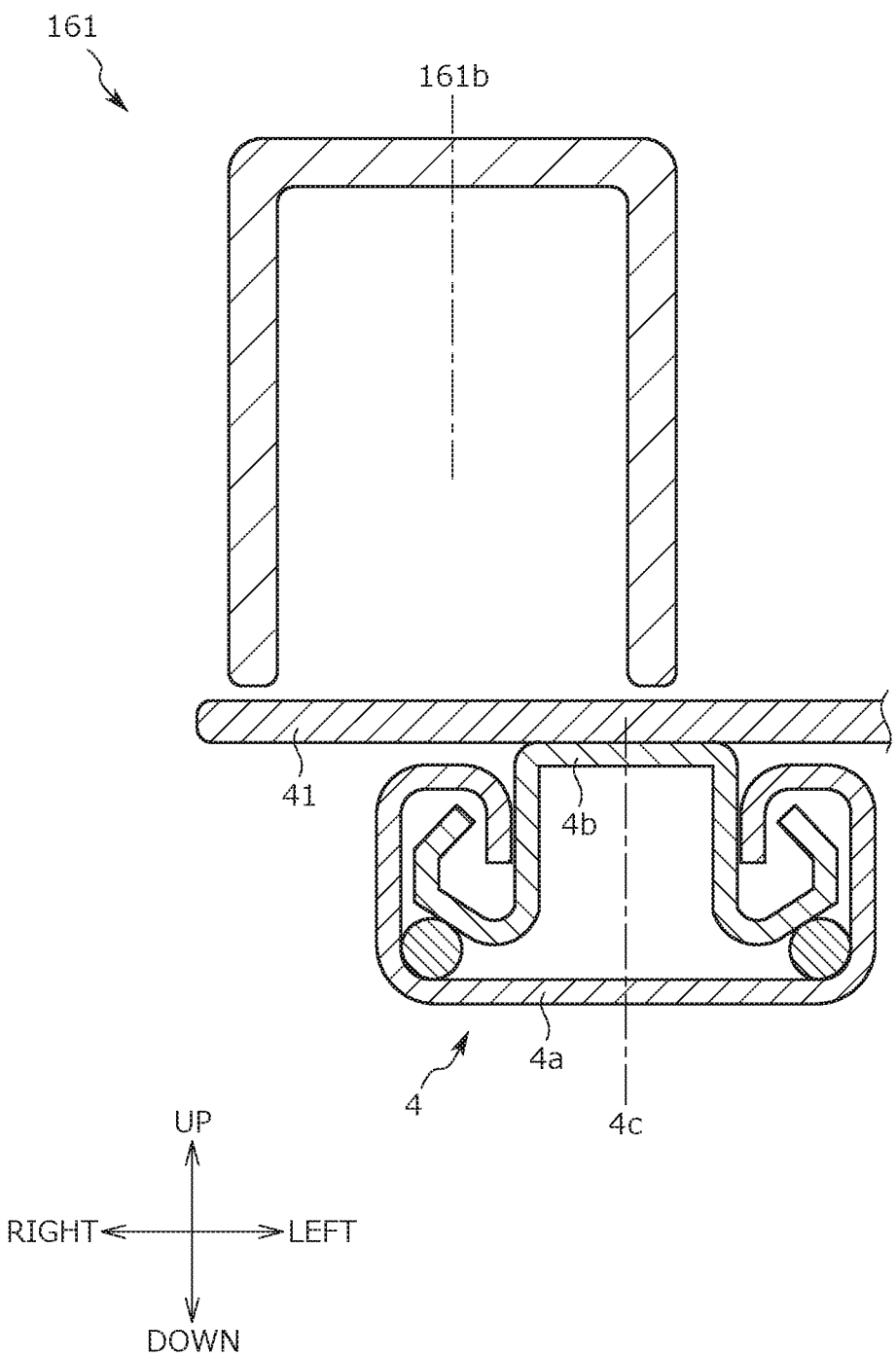
FIG. 23 is a Z-Z cross sectional view in FIG. 21.

FIG. 21 is a view of the base cover 160 (the cover member) when viewed from above. FIG. 22 shows a Y-Y cross sectional view in FIG. 21. FIG. 23 shows a Z-Z cross sectional view in FIG. 21. In the vehicle seat S2, the base cover 160 includes the first protruding part 161 and the second protruding part 162 that protrude upward at the both end portions in the seat width direction. In the vehicle seat S2, in the seatable state, the first protruding part 161 and the second protruding part 162 contact the under surface of the seat cushion 2, and thus support the seat cushion 2. As shown in FIGS. 22 and 23, in the seat width direction, the first protruding part 161 and the second protruding part 162 are disposed being offset on the outer side from the corresponding slide rail mechanisms 4. More specifically, in the seat width direction, a center line 161b of the first protruding part 161 is disposed being offset on the outer side from a center line 4c of the corresponding lower rail 4a and the upper rail 4b, and a center line 162b of the second protruding part 162 is disposed being offset on the outer side from the center line 4c of the corresponding lower rail 4a and the upper rail 4b. According to such a configuration, the seat cushion 2 can be stably supported.

Generally, the reclining locking device of the front seat of an automobile is a reclining locking unlock lever (e.g. the reclining operating lever 2T). When locking is turned off, a spiral spring that spring-biases the seat back forward operates, and the seat back is again locked at a desired position. Here, in the case of a vehicle seat in which the seat back is not spring-biased on the front side with the spiral spring, even though the occupant operates the reclining locking unlock lever, and the seat back does not automatically rotate forward, resulting in a problem that operating sensations are hard to be felt.

In the case of including the spiral spring that spring-biases the seat back forward, it is assumed that when the state is returned from the storage state (the dive down state) to the seated state, heaviness is felt.

Figure 24:
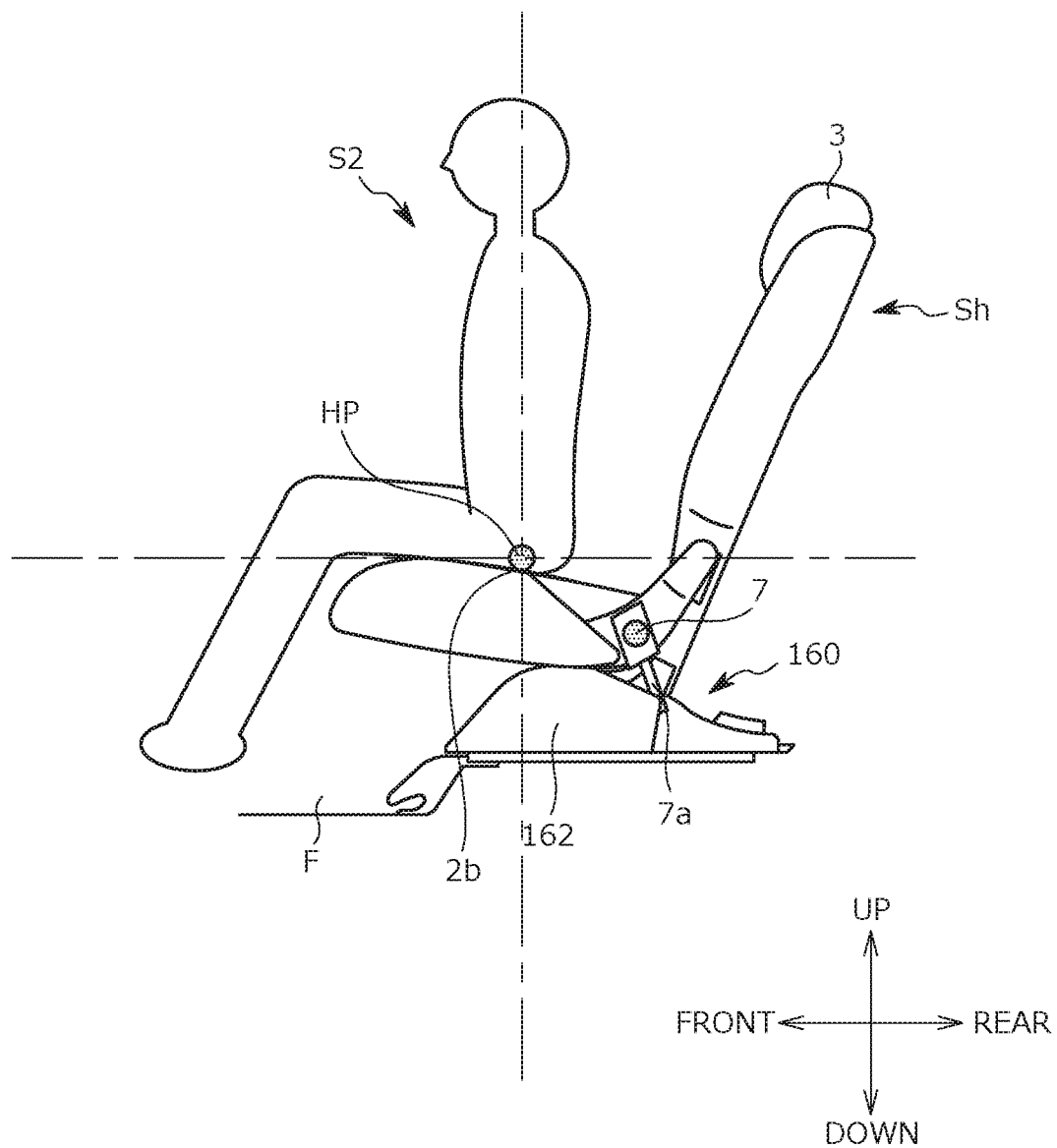
FIG. 24 is a side view in a state in which a seated occupant is seated on the conveyance seat when the seat state is in the seatable state.

As shown in FIG. 24, in the vehicle seat S2, a center part 2b of the seat cushion 2 is disposed forward from the first protruding part 161 and the second protruding part 162 in the seat front to back direction. With such a configuration, a hip point HP of the seated occupant is disposed forward from the first protruding part 161 and the second protruding part 162 (specifically, the top portion 161a of the first protruding part 161 and the top portion 162a of the second protruding part 162) of the base cover 160 (the cover member) in the seat front to back direction.

When the reclining locking unlock lever is operated to unlock the reclining locking, the seat back 1 starts to rotate forward due to the self weight of the occupant, and thus the operation of unlocking the reclining locking can be performed lightly. When the state is returned from the storage state (the dive downstate), there is only the self weight of the seat back 1 and the seat cushion 2, and thus an increase in the operation load can be suppressed. The seat back 1 tilts forward without using an additional biasing member (the spiral spring), and thus an increase in the number of parts can be suppressed.

Example Modifications

So far, the configuration of the conveyance seat according to the present invention is described taking examples. However, the foregoing embodiment is merely an example, and another embodiment is also thought.

For example, a detachable ottoman OT may be used. In the following, referring to FIGS. 25 to 28, the detachable ottoman OT and its application will be described.

Figure 25:
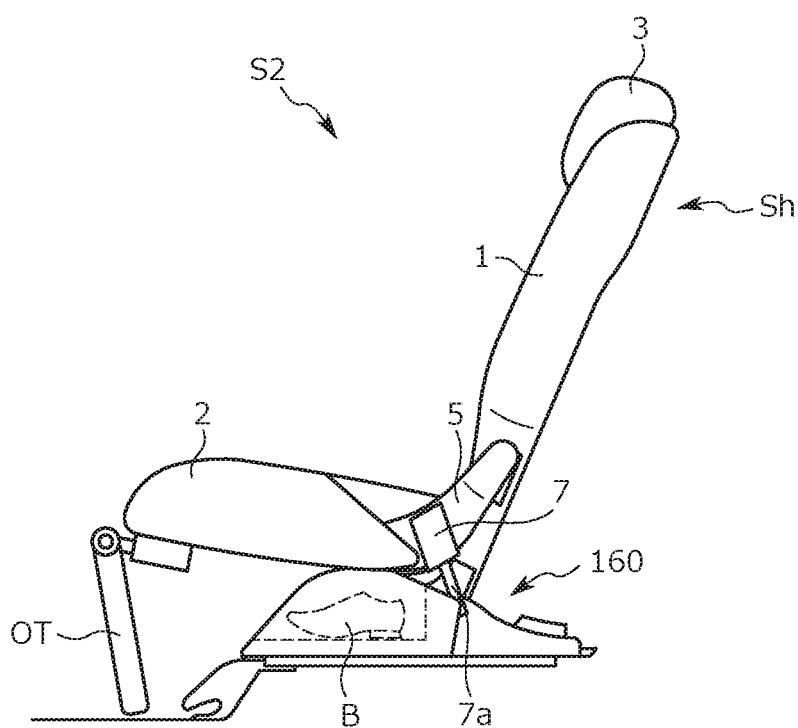
FIG. 25 is a side view of a conveyance seat that includes an ottoman in a seatable state.
Figure 25:
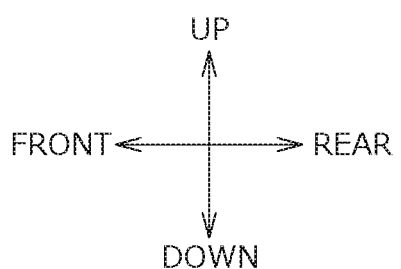

FIG. 25 is a side view when the vehicle seat S2 including the ottoman OT is in the seatable state. As shown in FIG. 25, the ottoman OT can cover the front of the bag accommodation recess 165 when viewed from the front surface of the vehicle seat S2. Specifically, when viewed from the front of the vehicle seat S2, an article B (in FIG. 25, the article is shown as shoes as an example) accommodated in the bag accommodation recess 165 can be hidden by the ottoman OT.

Figure 26:
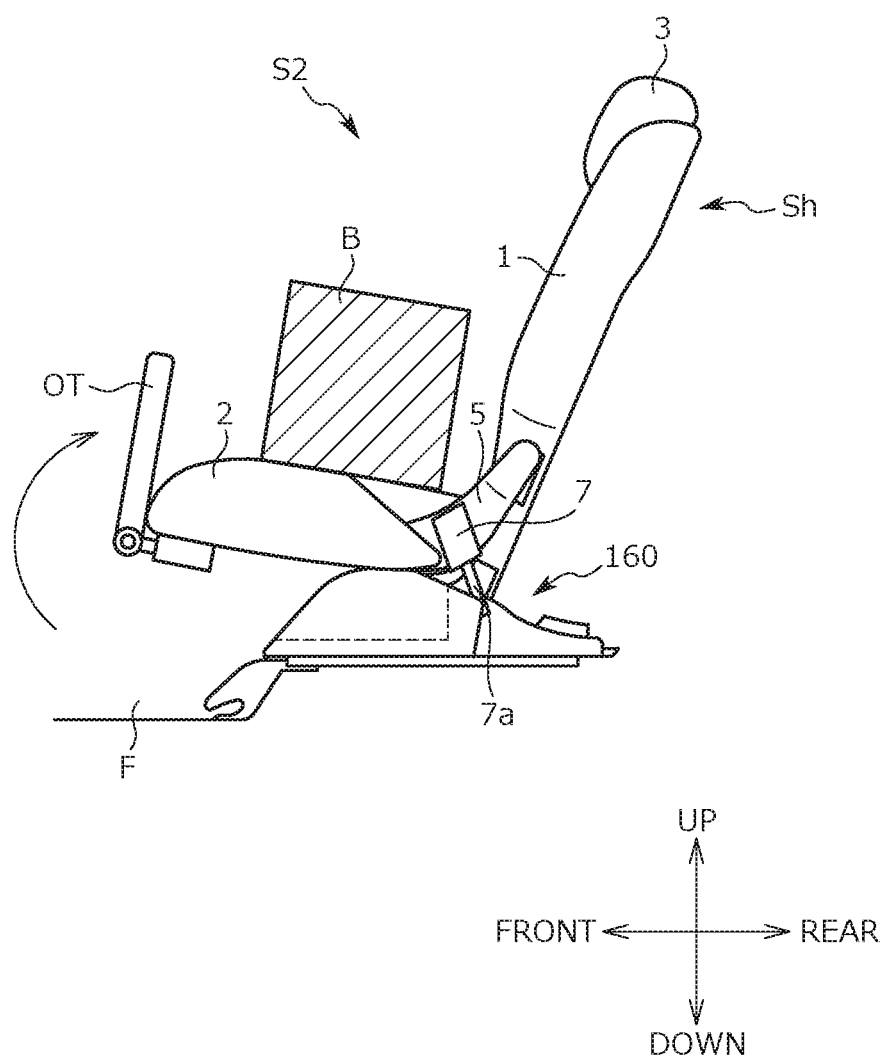
FIG. 26 is a side view in a state in which the ottoman is moved above when the conveyance seat is in a seatable state.

FIG. 26 is a side view in a state in which the ottoman OT is moved above when the vehicle seat S2 is in the seatable state. In the bag drop prevention mode shown in FIG. 26, the article B that is a bag placed on the seat cushion 2 can be prevented from moving forward and falling from the vehicle seat S2. In other words, the ottoman OT is rotated, and thus the ottoman OT can be used as a bag drop prevention barrier on the seat cushion 2.

Figure 27:
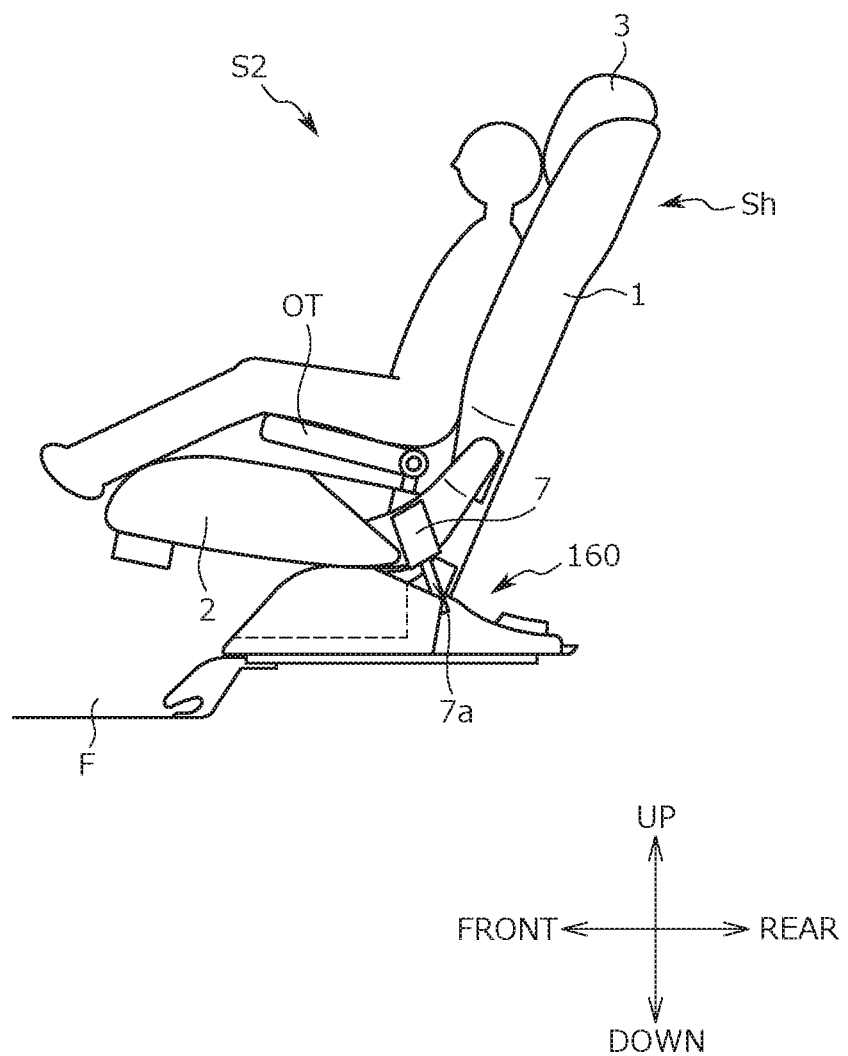
FIG. 27 is a side view in a state in which the ottoman is mounted on the seat cushion when the conveyance seat is in the seatable state.

FIG. 27 is a side view in a state in which the ottoman OT is mounted on the seating surface of the seat cushion 2 when the vehicle seat S2 is in the seatable state. In a junior seat mode shown in FIG. 27, the ottoman OT is mounted on the rear side of the seat cushion 2, and the ottoman OT is disposed at a position higher than the seating surface of the seat cushion 2. In such a state, a child is seated on the ottoman OT, and thus the vehicle seat S2 can be used as a child seat.

Figure 28:
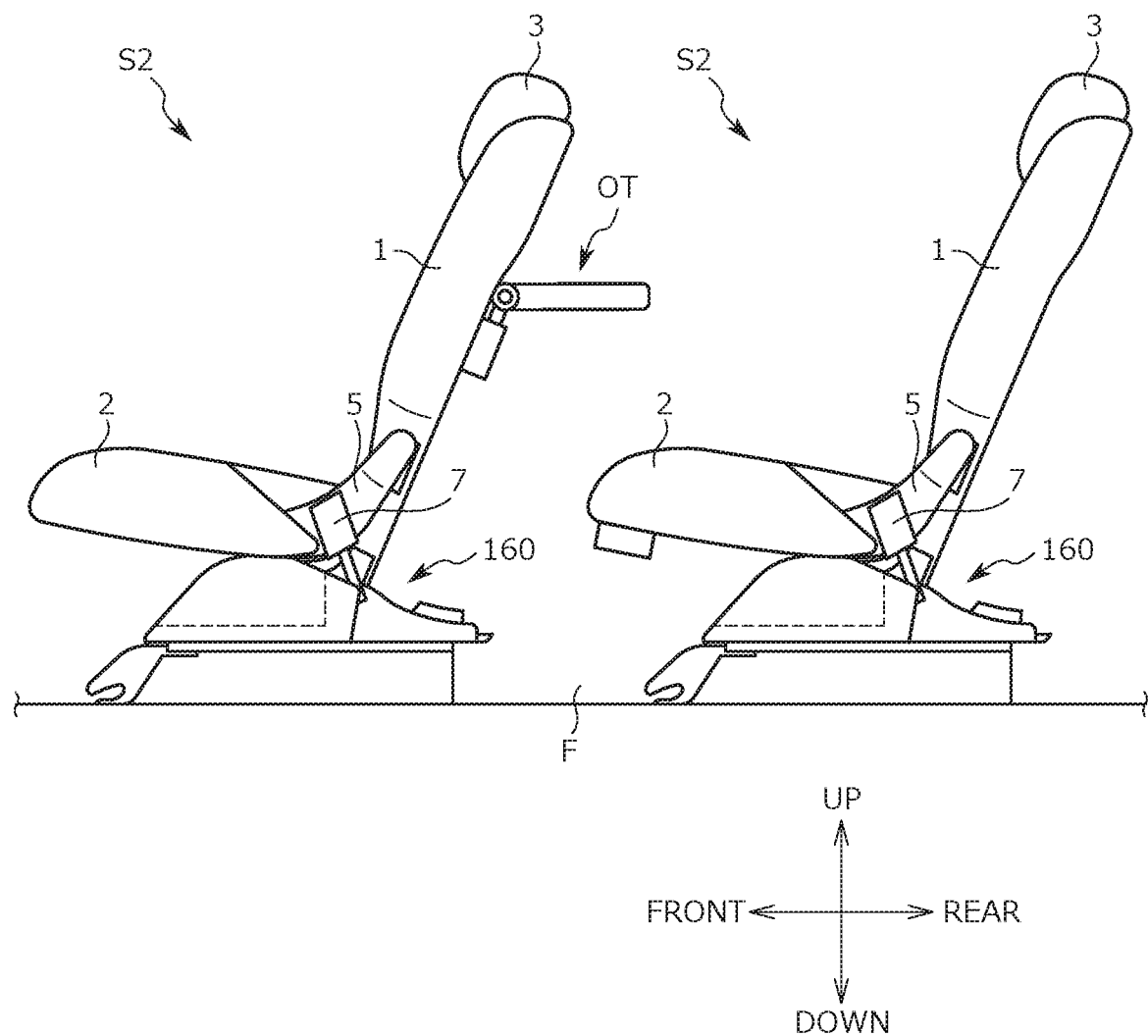
FIG. 28 is a side view in a state in which the ottoman is mounted on the back surface of the seat back of the conveyance seat in a front row.

FIG. 28 is a side view in a state in which the ottoman OT is mounted on the back surface of the seat back 1 of the vehicle seat S2 in the front row. In a table mode shown in FIG. 28, when the ottoman is viewed from the seated occupant on the vehicle seat S2 on the rear side, the ottoman OT mounted on the back surface of the seat back 1 of the vehicle seat S2 in front can be used as a table. At this time, preferably, the back side of the ottoman OT, i.e., the top surface (placement surface) when used as a table is formed as a resin tray.

Figure 29:
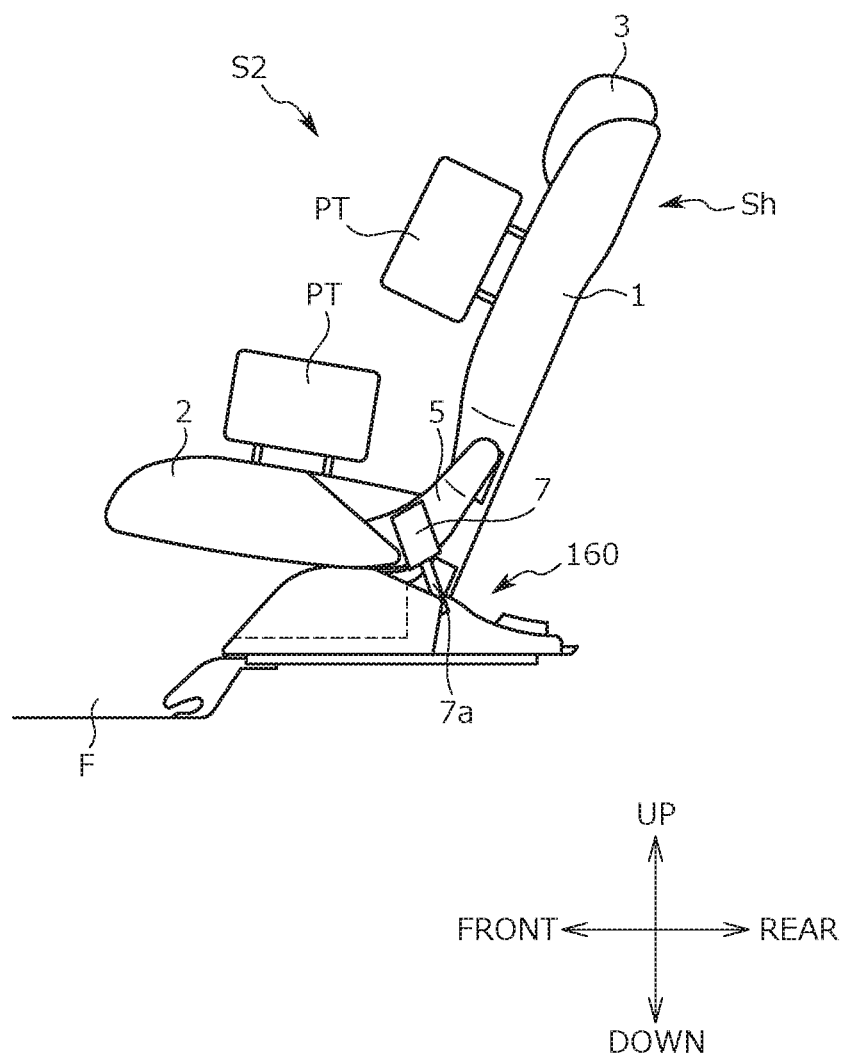
FIG. 29 is a side view in a state in which a plate member is mounted on the seat cushion when the conveyance seat is in a seatable state.

The ottoman OT may be applicable to the vehicle seat S2 as a detachable plate member PT. FIG. 29 is a side view in a state in which the detachable plate member PT is mounted on the seat back 1 or the seat cushion 2 when the vehicle seat S2 is in the seatable state. In a partition mode shown in FIG. 29, a bag that is placed on the vehicle seat S2 can be prevented from collapsing, or the occupants can be prevented from bumping against each other in cornering, for example. The way to mount the plate member PT in the seat width direction can be appropriately adjusted. The plate member PT can be mounted only at a given side in the seat width direction, or the plate member PT can be mounted on both sides in the seat width direction.

REFERENCE SIGNS LIST

1: Seat back
  1a: Rear end portion
2: Seat cushion
  2a: Slit
  2b: Center part
  2c: First contact portion
  2S: Slide rail operating lever
  2T: Reclining operating lever 3: Headrest
4: Slide rail mechanism
    4a: Lower rail
    4b: Upper rail
    4c: Center line
5: Coupling member
    5a: Coupling member main body part (cushion side frame)
    5b: Coupling member cover part
6: Armrest
7: Buckle
    7a: Support bracket
8: operation strap (operation member)
9: Convenient hook
10: Seat back frame
11: Coupling link (back side frame)
Ax: Rotating shaft (first rotating shaft, second rotating shaft)
13: Reclining device
20: Seat cushion frame
25: Cushion locking device (tip-up locking device)
26: Damper (convex projection)
40: Support base
41: Base bracket
42: Front coupling part
43: Center coupling part
60, 160: Base cover (cover member)
61: Guide part
    61a: Opening
    61c: Second contact portion
    61L: First guide part
    61R: Second guide part
    61LF, 61RF: Cushion frame
62: Boss-shaped rib (rib)
63: Projecting-shaped rib (rib)
64: Iron core (reinforcement member)
65: Reinforcement wire (reinforcement member)
66: Holding part
67: Bag storage part
68: Insertion hole
70: Cable
80: Cushion locking device
81: Locking piece
82: Engagement member
    82a: First engagement hole
    82b: Second engagement hole
F: Storage floor
S: Vehicle seat (conveyance seat)
Sh: Seat main body
V: Cavity
160: Base cover (accommodation part)
    160a: Rear-side base cover
    160b: Front-side base cover
161: First protruding part
    161a: Top portion
    161b: Center line
162: Second protruding part
    162a: Top portion
    162b: Center line
163: Front part
164: Rear side projecting part
165: Bag accommodation recess (recess, bag storage part)
    166a: Engagement recess
    166b: Engagement protrusion
OT: Ottoman
B: Article
PT: Plate member
HP: Hip point

The invention claimed is:

1. A conveyance seat comprising:
a seat main body that includes a seat back and a seat cushion, the seat main body being operable to switch a state between a seatable state in which the seat back is erected to a car body floor to allow a seated occupant to be seated on the seat cushion and a storage state in which the seat back tilts down to the car body floor and the seat cushion is disposed between the seat back and the car body floor; and
a guide part that contacts a lower portion of the seat cushion to support the seat cushion when the state is in the seatable state, and slidably contacts a part of the seat main body to guide movement of the seat back and the seat cushion in transition of the state to the storage state, wherein
the lower portion of the seat cushion includes a first contact portion that contacts the guide part, and the guide part includes a second contact portion that contacts the lower portion of the seat cushion,
when the state is in the seatable state, the first contact portion of the seat cushion is arranged at a position that overlaps the second contact portion of the guide part in an up to down direction, and
when the state is in the storage state, a lower end of the guide part is arranged at a position above a back surface of the seat cushion.

2. The conveyance seat according to claim 1, further comprising a seat belt wearing buckle that is disposed at a side position of the seat main body in a width direction of the seat main body, wherein
the guide part is disposed at a position out of a range in which the buckle is provided in the width direction.

3. The conveyance seat according to claim 1, further comprising an armrest that is mounted at an end portion of the seat back in a width direction of the seat main body, wherein
the guide part is disposed so as to cross a range in which the armrest is provided in the width direction.

4. The conveyance seat according to claim 1, wherein
the guide part is formed in which a part of a resin molded component protrudes upward,
a cavity is provided on an inner side of a protruding part that constitutes the guide part in the resin molded component, and
in the cavity, a reinforcement member that reinforces an upper end portion of the protruding part is accommodated.

5. The conveyance seat according to claim 1, wherein
when the state is in the seatable state, the guide part directly contacts a back surface of the seat cushion.

6. The conveyance seat according to claim 1, wherein
the second contact portion of the guide part is provided at an upper end of the guide part.

7. The conveyance seat according to claim 1, further comprising a coupling member that couples the seat back and the seat cushion, wherein
when the state is in the storage state, a rear end of the coupling member is disposed in front of the guide part.

8. The conveyance seat according to claim 7, wherein
when the state is in the storage state, an upper end of the coupling member is disposed at a same position in the up to down direction as an upper end of the guide part.

9. The conveyance seat according to claim 1, wherein
when the state is in the storage state, an upper end of the guide part is arranged at a position above an upper surface of the seat cushion.

10. A conveyance seat comprising:

a seat main body that includes a seat back and a seat cushion, the seat main body being operable to switch a state between a seatable state in which the seat back is erected to a car body floor to allow a seated occupant to be seated on the seat cushion and a storage state in which the seat back tilts down to the car body floor and the seat cushion is disposed between the seat back and the car body floor; and a guide part that guides movement of the seat back and the seat cushion in which when the state is in the seatable state, the guide part contacts the seat cushion to support the seat cushion, and in transition of the state to the storage state, the guide part slidably contacts a part of the seat main body, wherein the guide part has a first guide part and a second guide part that are disposed at positions separated from each other in a width direction of the seat main body, the first guide part and the second guide part are integrated as one component, and a component that forms the first guide part and the second guide part is provided with a bag storage part that is formed between the first guide part and the second guide part in the width direction.

11. The conveyance seat according to claim 10, further comprising a seat belt wearing buckle that is disposed at a side position of the seat main body in a width direction of the seat main body, wherein the guide part is disposed at a position out of a range in which the buckle is provided in the width direction.

12. The conveyance seat according to claim 10, further comprising an armrest that is mounted at an end portion of the seat back in a width direction of the seat main body, wherein the guide part is disposed so as to cross a range in which the armrest is provided in the width direction.

13. A conveyance seat comprising:

a seat main body that includes a seat back and a seat cushion, the seat main body being operable to switch a state between a seatable state in which the seat back is erected to a car body floor to allow a seated occupant to be seated on the seat cushion and a storage state in which the seat back tilts down to the car body floor and the seat cushion is disposed between the seat back and the car body floor; and a guide part that contacts a lower portion of the seat cushion to support the seat cushion when the state is in the seatable state, and slidably contacts a part of the seat main body to guide movement of the seat back and the seat cushion in transition of the state to the storage state, wherein the lower portion of the seat cushion includes a first contact portion that contacts the guide part, and the guide part includes a second contact portion that contacts the lower portion of the seat cushion, when the state is in the seatable state, the first contact portion of the seat cushion is arranged at a position that overlaps the second contact portion of the guide part in an up to down direction, and when the state is in the storage state, an upper end of the guide part is arranged at a position above an upper surface of the seat cushion.

* * * * *